(12) United States Patent
Lee et al.

(10) Patent No.: US 10,928,961 B2
(45) Date of Patent: Feb. 23, 2021

(54) PRESSURE SENSOR AND DISPLAY DEVICE INCLUDING THE SAME

(71) Applicant: Samsung Display Co., Ltd., Yongin-si (KR)

(72) Inventors: Kang Won Lee, Seoul (KR); Choon Hyop Lee, Anyang-si (KR); Seung Hwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/408,543

(22) Filed: May 10, 2019

(65) Prior Publication Data

US 2020/0201484 A1  Jun. 25, 2020

(30) Foreign Application Priority Data

Dec. 21, 2018  (KR) .......................... 10-2018-0167790

(51) Int. Cl.
*G06F 3/044* (2006.01)

(52) U.S. Cl.
CPC ................................. *G06F 3/0445* (2019.05)

(58) Field of Classification Search
CPC .................................................... G06F 3/0445
See application file for complete search history.

(56) References Cited

U.S. PATENT DOCUMENTS

2017/0177160 A1* 6/2017 Oh .......................... G06F 3/0418
2020/0033971 A1 1/2020 Lee et al.

FOREIGN PATENT DOCUMENTS

KR  2020-0013203  2/2020

* cited by examiner

*Primary Examiner* — Gustavo Polo
(74) *Attorney, Agent, or Firm* — H.C. Park & Associates, PLC

(57) ABSTRACT

A pressure sensor includes: first and second substrates; a first driving electrode and a first sensing electrode disposed on a first surface of the first substrate that faces the second substrate; a spacer disposed on the first surface of the first substrate between the first driving electrode and the first sensing electrode; and a first pressure sensing layer disposed on a first surface of the second substrate that faces the first substrate and overlapping with the first driving electrode and the first sensing electrode in a thickness direction.

20 Claims, 27 Drawing Sheets

PRESSURE SENSOR AND DISPLAY DEVICE INCLUDING THE SAME

CROSS-REFERENCE TO RELATED APPLICATION

This application claims priority from and the benefit of Korean Patent Application No. 10-2018-0167790, filed on Dec. 21, 2018, which is hereby incorporated by reference for all purposes as if fully set forth herein.

BACKGROUND

Field

Exemplary embodiments of the invention relate to a pressure sensor and a display device including the same.

Discussion of the Background

An electronic device such as a smartphone, a tablet personal computer (PC), a digital camera, a notebook computer, a navigation device, or a smart television (TV) which provides an image to a user includes a display device for displaying an image. The display device includes a display panel which generates and displays an image and various input devices.

Meanwhile, touch panels capable of recognizing touch input have recently been employed in display devices such as smartphones or tablet PCs and are increasingly replacing existing physical input devices such as keypads because of their highly convenient touch method. Further, research has been conducted into ways to mount pressure sensors in display devices to realize a variety of inputs.

Research has been conducted on ways to provide a display device not only with a touch panel, but also a pressure sensor, and thus to realize a variety of input. The resistance detected by a pressure sensor may vary depending on the force that the user presses the pressure sensor with. For example, if the user presses the pressure sensor hard, as high a resistance as 100 kΩ may be detected by the pressure sensor, and if the user presses the pressure sensor lightly, as low a resistance as 20 kΩ may be detected by the pressure sensor. Accordingly, the range of resistances that a pressure sensing unit of the pressure sensor is supposed to detect may be undesirably wide.

Also, if the user presses the pressure sensor for a long period of time, the pressure sensor may not be able to be restored to its initial resistance even when the force that the user presses the pressure sensor with disappears.

The above information disclosed in this Background section is only for understanding of the background of the inventive concepts, and, therefore, it may contain information that does not constitute prior art.

SUMMARY

Devices constructed according to exemplary embodiments of the invention are capable of providing a pressure sensor having an improved restorability to its initial resistance.

Exemplary embodiments of the invention are also capable of providing a display device including a pressure sensor having an improved restorability to its initial resistance.

Additional features of the inventive concepts will be set forth in the description which follows, and in part will be apparent from the description, or may be learned by practice of the inventive concepts.

According to an exemplary embodiment, there is provided a pressure sensor. The pressure sensor includes: first and second substrates; a first driving electrode and a first sensing electrode disposed on a first surface of the first substrate that faces the second substrate; a spacer disposed on the first surface of the first substrate between the first driving electrode and the first sensing electrode; and a first pressure sensing layer disposed on a first surface of the second substrate that faces the first substrate and overlapping with the first driving electrode and the first sensing electrode in a thickness direction.

The pressure sensor may be configured to form gaps between the first pressure sensing layer and the first driving electrode and between the first pressure sensing layer and the first sensing electrode.

A second driving electrode and a second sensing electrode may be disposed on the first surface of the first substrate, and a second pressure sensing layer may be in contact with the second driving electrode and the second sensing electrode.

The spacer may be formed as a bar and be disposed between the first driving electrode and the first sensing electrode.

A width of the spacer may be smaller than widths of the first driving electrode and the first sensing electrode.

A height of the spacer may be smaller than heights of the first driving electrode and the first sensing electrode.

The spacer may include a plurality of protrusions, and the protrusions may be spaced apart from one another and not overlap with the first driving electrode and the first sensing electrode in the thickness direction.

A plurality of first driving electrodes and a plurality of first sensing electrodes may be disposed on the first surface of the first substrate, and the plurality of first driving electrodes and the plurality of first sensing electrodes may be arranged along a first direction to alternate with one another in a second direction, which intersects the first direction.

The pressure sensor may further include a driving connecting electrode to which the plurality of first driving electrodes and the second driving electrode are connected; and a sensing connecting electrode to which the plurality of first sensing electrodes and the second sensing electrode are connected, wherein the spacer may be disposed between the driving connecting electrode and the sensing connecting electrode.

The pressure sensor may further include a driving line connected to the driving connecting electrode and configured to receive a driving voltage; and a sensing line connected to the sensing connecting electrode.

The number of first driving electrodes may be greater than the number of second driving electrodes, and the number of first sensing electrodes may be greater than the number of second sensing electrodes.

In another exemplary embodiment, a pressure sensor may include: a first sensing cell including a first driving electrode and a first sensing electrode disposed on a first surface of a first substrate, and a first pressure sensing layer disposed on a first surface of a second substrate that faces the first substrate; a second sensing cell including a first driving electrode and a first sensing electrode; and a partition wall disposed between the first and second sensing cells.

The partition wall may be in contact with the first surfaces of the first and second substrates.

The pressure sensor may be configured to form gaps between the first pressure sensing layer and the first driving electrode and between the first pressure sensing layer and the first sensing electrode.

Each of the first and second sensing cells further may include a second driving electrode and a second sensing electrode disposed on the first surface of the first substrate that faces the second substrate, and a second pressure sensing layer disposed in contact with the second driving electrode and the second sensing electrode.

A coupling layer may be disposed between the first and second substrates to surround the first and second substrates, wherein the coupling layer and the partition wall are connected to each other.

The first sensing cell further may include a spacer disposed to overlap with the first pressure sensing layer, but not with the first driving electrode and the first sensing electrode of the first sensing cell, in a thickness direction, and the pressure sensor may be configured to form a gap between the first pressure sensing layer and the spacer.

In a further exemplary embodiment, a display device may include: a display panel; and a pressure sensor disposed on a bottom surface of the display panel, wherein the pressure sensor may include first and second substrates, a first driving electrode and a first sensing electrode disposed on a first surface of the first substrate that faces the second substrate, a spacer disposed on the first surface of the first substrate between the first driving electrode and the first sensing electrode, and a first pressure sensing layer disposed on a first surface of the second substrate that faces the first substrate and overlaps with the first driving electrode and the first sensing electrode in a thickness direction, and the pressure sensor may be configured to form gaps between the first pressure sensing layer and the first driving electrode and between the first pressure sensing layer and the first sensing electrode.

The display panel may include a panel protruding part that protrudes from one side of the display panel, and the display device may further include an additional pressure sensor disposed on a bottom surface of the panel protruding part.

A cover window disposed on the display panel and comprising a light-transmitting part corresponding to a display area of the display panel, and a side light-transmitting part overlapping with the panel protruding part.

According to the aforementioned and other embodiments of the inventive concepts, since spacers are provided between a driving electrode and a sensing electrode of a pressure sensor, the restorability of the pressure sensor to its initial resistance can be improved.

In addition, since each pressure sensing cell includes a first resistance that varies in accordance with pressure applied thereto by a first pressure sensing layer and a second resistance that is defined by a second pressure sensing layer that is in contact with a second sensing electrode, the range of resistances of each pressure sensing cell that a pressure sensing unit is supposed to detect can be considerably reduced, and as a result, the manufacturing cost of the pressure sensing unit can be lowered.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
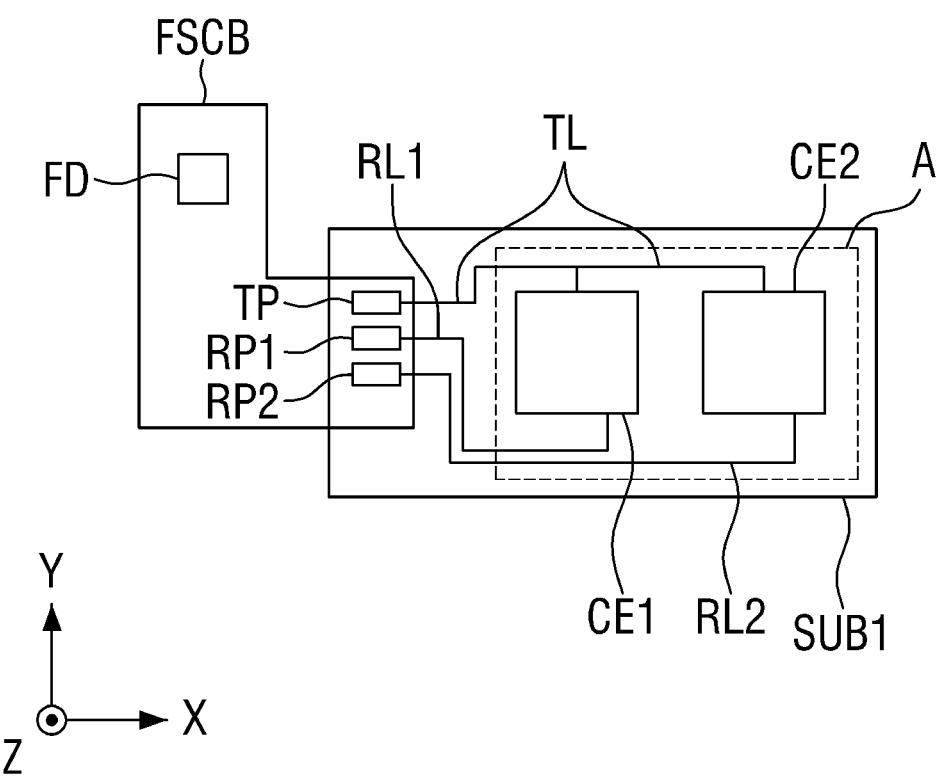
FIG. 1 is a plan view of a pressure sensor according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as a pressure sensing unit and a touch driving unit. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Embodiments of the present disclosure will hereinafter be described with reference to the accompanying drawings.

Figure 2:
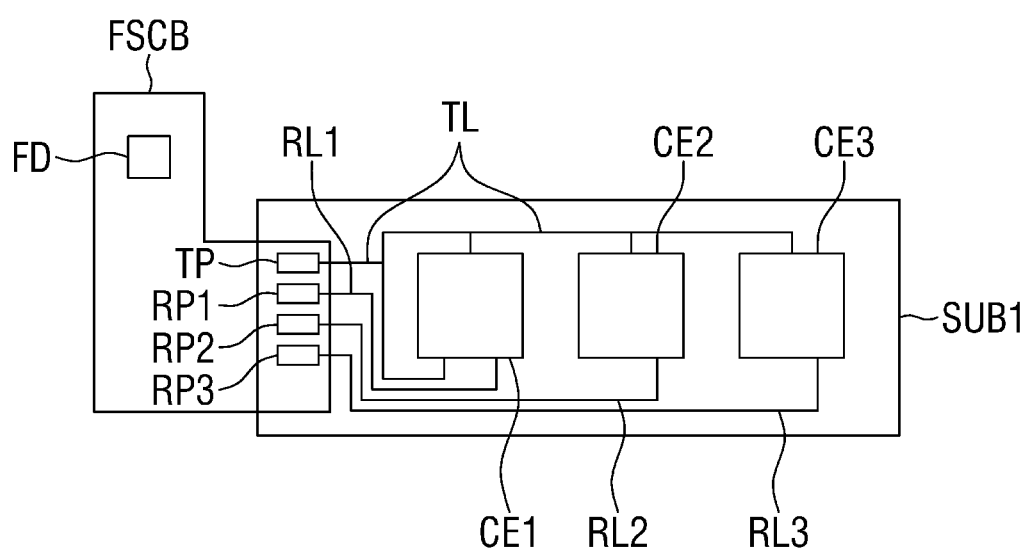
FIG. 2 is a plan view of a pressure sensor according to an exemplary embodiment.

FIG. 1 is a plan view of a pressure sensor according to an exemplary embodiment, and FIG. 2 is a plan view of a pressure sensor according to an exemplary embodiment.

Referring to FIG. 1, a pressure sensor 10 may extend in one direction, for example, in a first direction (or an X-axis direction), in a plan view, in which case, the length of the pressure sensor 10 in the first direction (or the X-axis direction) may be greater than the width of the pressure sensor 10. However, the shape of the pressure sensor 10 is not particularly limited and may vary depending on the location of the pressure sensor 10.

The pressure sensor 10 includes a first substrate SUB1, first and second sensing cells CE1 and CE2, a driving line TL, first and second sensing lines RL1 and RL2, a driving pad TP, and first and second sensing pads RP1 and RP2.

The first substrate SUB1 may include a polyethylene (PE)-, polyimide (PI)-, polycarbonate (PC)-, polysulfone-, polyacrylate (PA)-, polystyrene (PS)-, polyvinyl chloride (PVC)-, polyvinyl alcohol (PVA)-, polynorbornene-, or polyester-based material. In one embodiment, the first substrate SUB1 may be formed as a polyethylene terephthalate (PET) film or a PI film.

Sensing cells are disposed on one surface of the first substrate SUB1. For example, the first and second sensing cells CE1 and CE2 may be disposed on one surface of the first substrate SUB1, but the exemplary embodiments are not limited thereto. That is, the number of sensing cells provided may vary depending on the functions and the location of the pressure sensor 10. FIG. 1 illustrates that the first and second sensing cells CE1 and CE2 are arranged in a row, but the exemplary embodiments are not limited thereto. Alternatively, the first and second sensing cells CE1 and CE2 may be arranged in multiple rows if necessary.

The first and second sensing cells CE1 and CE2 may be disposed on the first substrate SUB1 to be spaced apart from each other, but the exemplary embodiments are not limited thereto. Alternatively, the first and second sensing cells CE1 and CE2 may be arranged next to each other on the first substrate SUB1 with no gap therebetween.

The first sensing cell CE1 may detect a resistance variation caused by pressure, and the second sensing cell CE2 may detect a resistance variation caused by temperature. For example, the pressure sensor 10 may detect pressure applied thereto, using the first sensing cell CE1 and may detect a resistance variation caused by temperature, using the second sensing cell CE2. Accordingly, a pressure sensing unit FD can compensate for a resistance value detected by the first sensing cell CE1 with a resistance value detected by the second sensing cell CE2 and can thus compensate for any discrepancy in the resistance value detected by the first sensing cell CE1, caused by temperature. Therefore, the reliability of the pressure sensor 10 can be improved. However, the exemplary embodiments are not limited to this. Alternatively, the first and second sensing cells CE1 and CE2 may both be implemented as pressure sensing cells.

Figure 26:
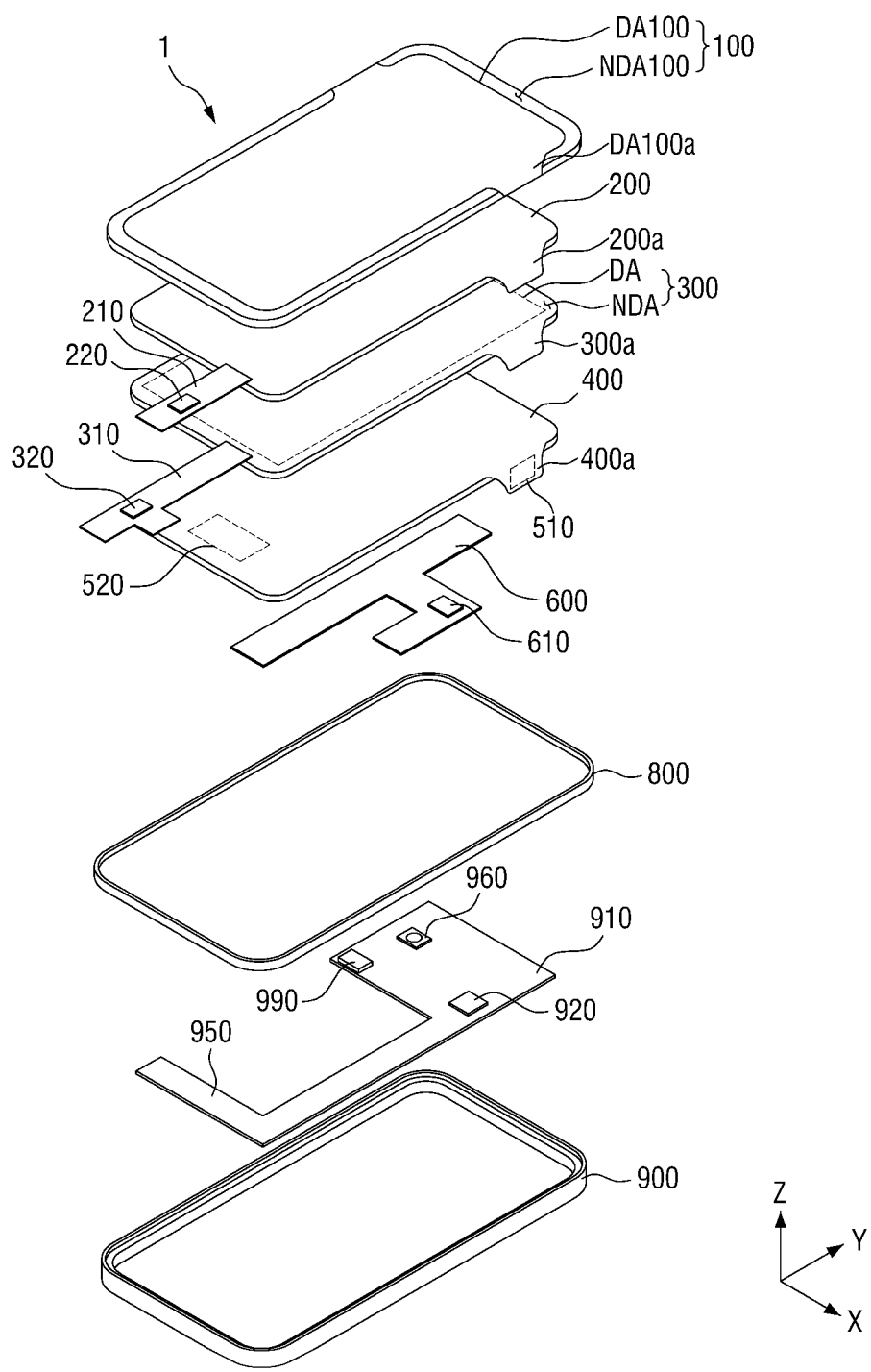
FIG. 26 is an exploded perspective view of the display device of FIG. 25.

The size of the first and second sensing cells CE1 and CE2 may vary depending on the purpose of use of the first and second sensing cells CE1 and CE2. For example, as illustrated in FIG. 26, in a case where the first and second sensing cells CE1 and CE2 are used as physical buttons such as volume buttons, which are disposed on a side of a display device 1, the first and second sensing cells CE1 and CE2 may be formed to have a similar size to physical buttons. Also, as illustrated in FIG. 26, in a case where the first and second sensing cells CE1 and CE2 are used to detect pressure applied to the front surface of the display device 1, the first and second sensing cells CE1 and CE2 may be formed to a size corresponding to a pressure sensing area.

Each of the first and second sensing cells CE1 and CE2 may be connected to at least one driving line and at least one sensing line. For example, as illustrated in FIG. 1, the first and second sensing cells CE1 and CE2 may both be connected to the same driving line, i.e., the driving line TL, and may be connected to different sensing lines, i.e., the first and second sensing lines RL1 and RL2, respectively. The first sensing cell CE1 may be connected to the driving line TL and the first sensing line RL1, and the second sensing cell CE2 may be connected to the driving line TL and the second sensing line RL2.

The driving line TL may be connected to the driving pad TP, and the first and second sensing lines RL1 and RL2 may be connected to the first and second sensing pads RP1 and RP2, respectively. For example, the first sensing line RL1 may be connected to the first sensing pad RP1, and the second sensing line RL2 may be connected to the second sensing pad RP2. The driving pad TP and the first and second sensing pads RP1 and RP2 may be disposed on one side of the first substrate SUB1 and may be connected to a pressure sensing circuit board FSCB via an anisotropic conductive film.

The pressure sensing circuit board FSCB may include the pressure sensing unit FD. The pressure sensing unit FD can detect pressure and temperature applied to the first and second sensing cells CE1 and CE2 by detecting current values or voltage values from the first and second sensing lines RL1 and RL2 via the first and second sensing pads RP1 and RP2. The pressure sensing unit FD may be mounted on the pressure sensing circuit board FSCB or another circuit board connected to the pressure sensing circuit board FSCB. In a case where the pressure sensing unit FD is not mounted on the pressure sensing circuit board FSCB, but on another circuit board connected to the pressure sensing circuit board FSCB, the pressure sensing unit FD can be incorporated into a driving unit performing other functions. For example, the pressure sensing unit FD may be incorporated into the touch driving unit 220 of the touch circuit board 210 of FIG. 26.

Referring to FIG. 2, a pressure sensor 10_1 includes a first substrate SUB1, first, second, and third sensing cells CE1, CE2, and CE3, a driving line TL, first, second, and third sensing lines RL1, RL2, and RL3, a driving pad TP, and first, second, and third sensing pads RP1, RP2, and RP3.

The first and third sensing cells CE1 and CE3 may detect a resistance variation caused by pressure, and the second sensing cell CE2 may detect a resistance variation caused by temperature. For example, the pressure sensor 10_1 may detect pressure applied thereto, using the first and third sensing cells CE1 and CE3 and may detect a resistance variation caused by temperature, using the second sensing cell CE2. Accordingly, the pressure sensing unit FD, which is disposed on the display circuit board 310 (see FIG. 26), can compensate for resistance values detected by the first and third sensing cells CE1 and CE3 with a resistance value detected by the second sensing cell CE2 and can thus compensate for any discrepancies in the resistance values detected by the first and third sensing cells CE1 and CE3, caused by temperature.

Each of the first, second, and third sensing cells CE1, CE2, and CE3 may be connected to at least one driving line and at least one sensing line. For example, as illustrated in FIG. 2, the first, second, and third sensing cells CE1, CE2, and CE3 may all be connected to the same driving line, i.e., the driving line TL, and may be connected to different sensing lines, i.e., the first, second, and third sensing lines RL1, RL2, and RL3, respectively. For example, the first sensing cell CE1 may be connected to the driving line TL and the first sensing line RL1, the second sensing cell CE2 may be connected to the driving line TL and the second sensing line RL2, and the third sensing cell CE3 may be connected to the driving line TL and the third sensing line RL3.

The driving line TL may be connected to the driving pad TP, and the first, second, and third sensing lines RL1, RL2, and RL3 may be connected to the first, second, and third sensing pads RP1, RP2, and RP3, respectively. For example, the first sensing line RL1 may be connected to the first sensing pad RP1, the second sensing line RL2 may be connected to the second sensing pad RP2, and the third sensing line RL3 may be connected to the third sensing pad RP3. The driving pad TP and the first, second, and third sensing pads RP1, RP2, and RP3 may be disposed on one side of the first substrate SUB1 and may be connected to the pressure sensing circuit board FSCB via an anisotropic conductive film.

The structure of the pressure sensor 10 is not limited to that illustrated in FIGS. 1 and 2, and the number, pattern of arrangement, and functions of sensing cells provided in the pressure sensor 10 may vary depending on the functions and the location of the pressure sensor 10. The pressure sensor 10 will hereinafter be described, taking the structure illustrated in FIG. 1 as an example.

Figure 3:
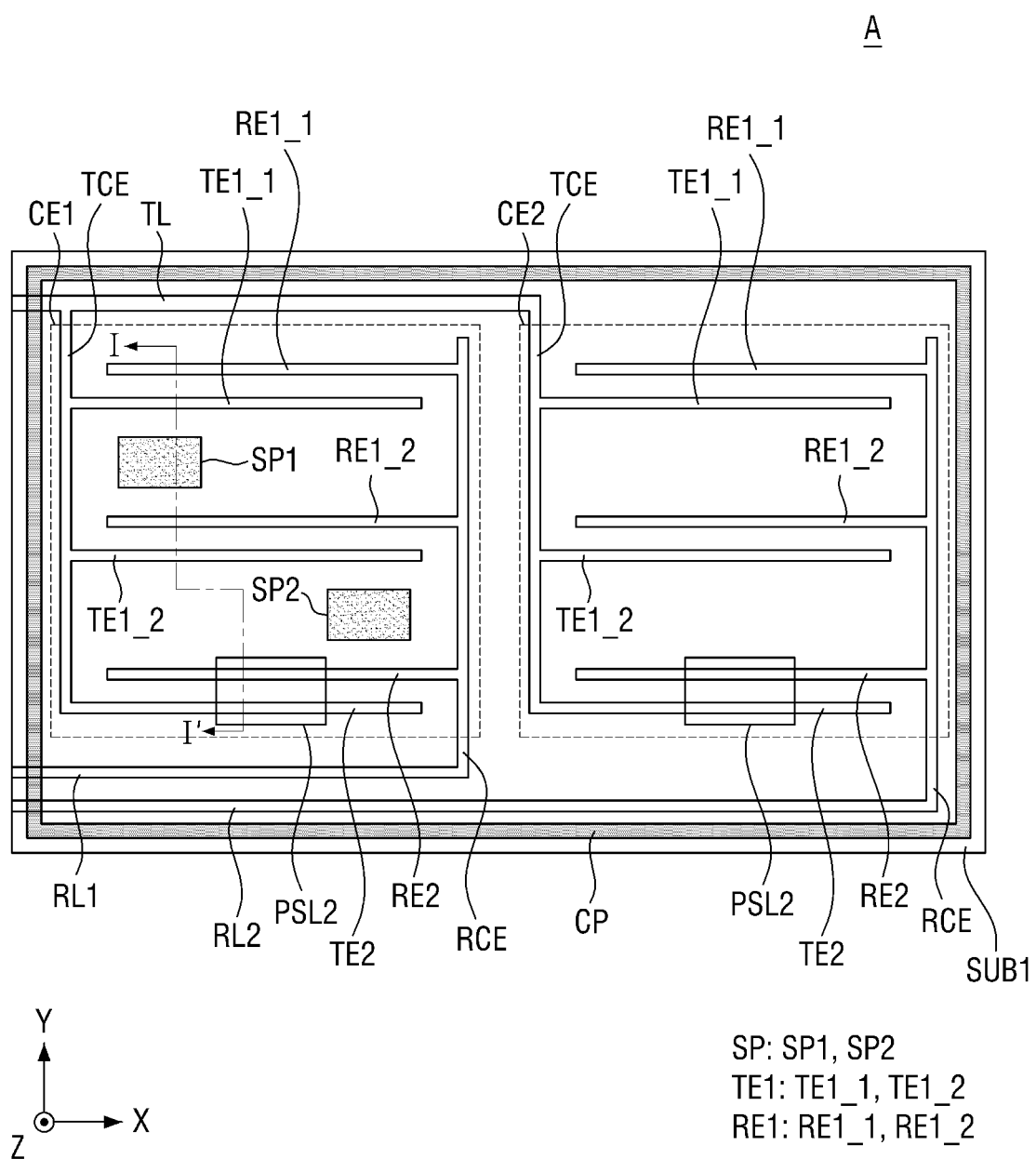
FIG. 3 is an exemplary enlarged plan view illustrating an area A of FIG. 1.
Figure 4:
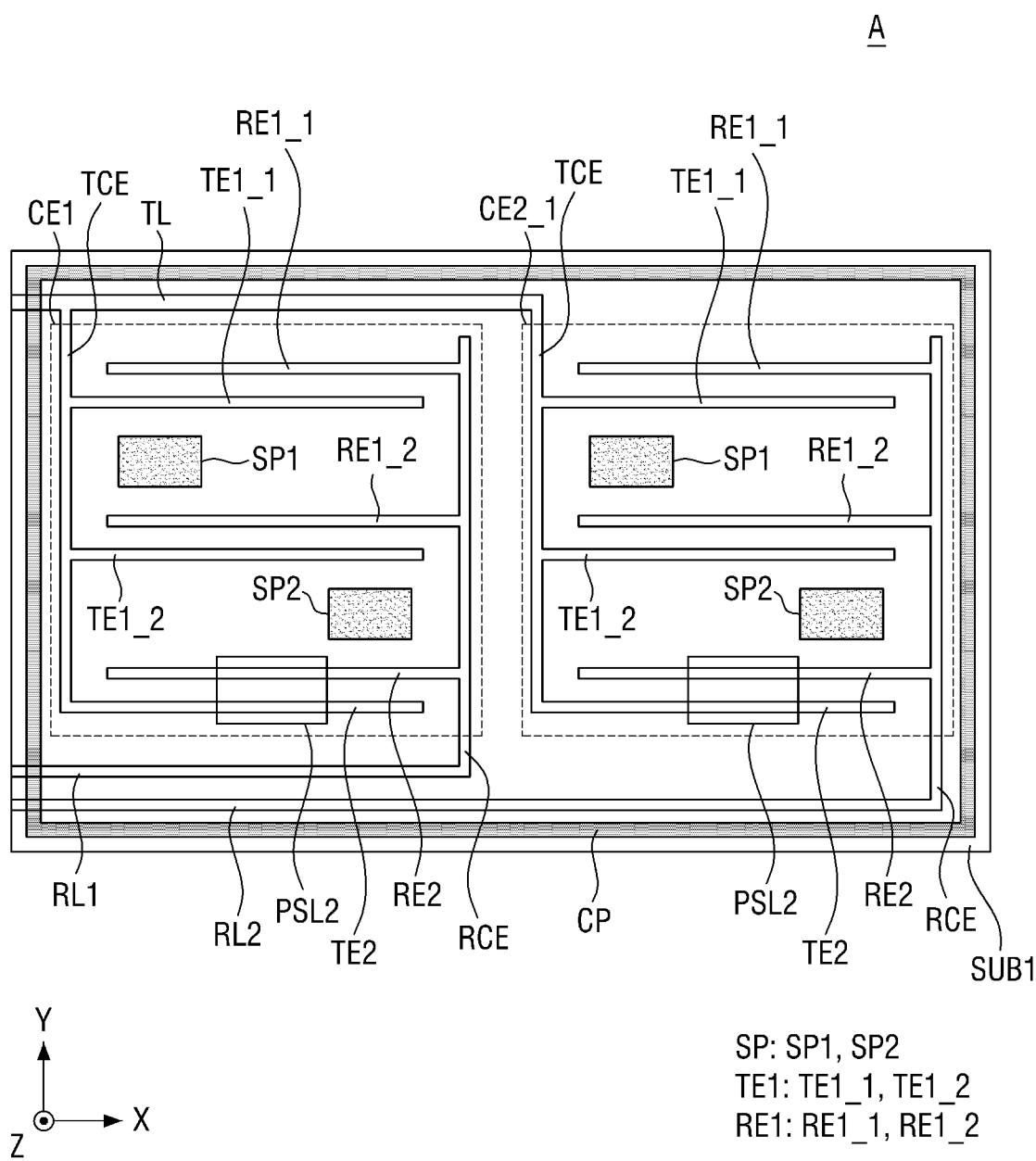
FIG. 4 is another exemplary enlarged plan view illustrating the area A of FIG. 1.
Figure 5:
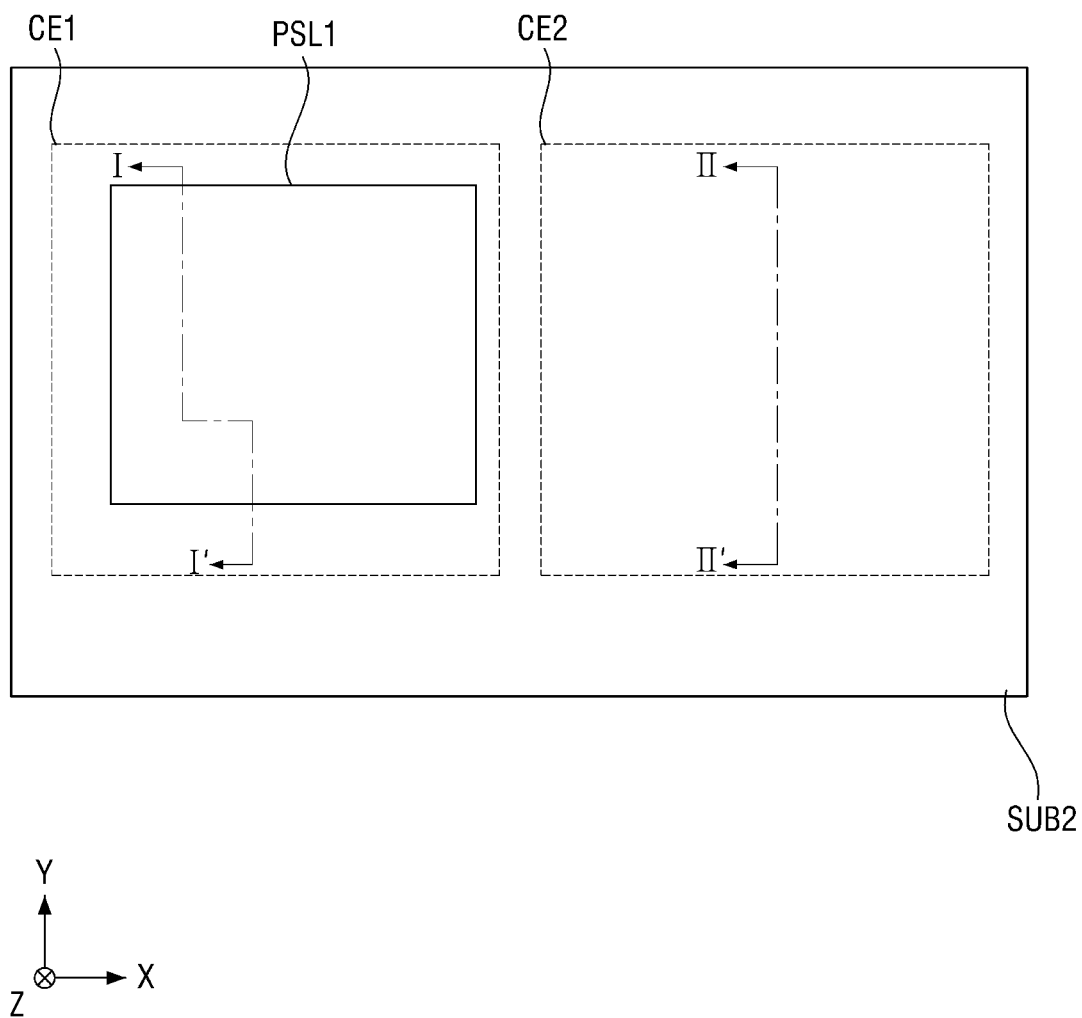
FIG. 5 is a plan view illustrating a second substrate of a pressure sensor according to an exemplary embodiment.
Figure 6:
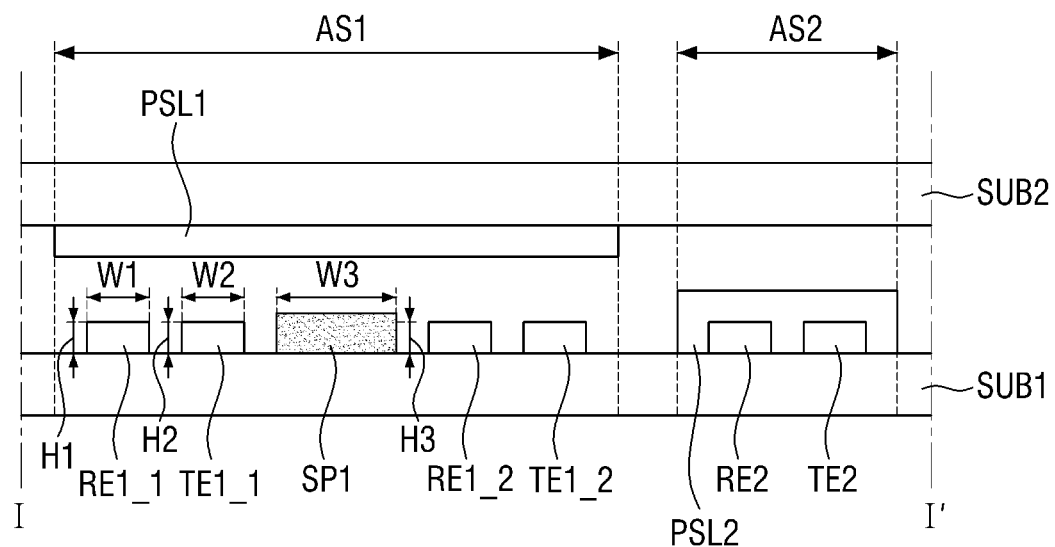
FIG. 6 is a cross-sectional view, taken along line I-I' of FIG. 3 or 5, of a pressure sensor according to an exemplary embodiment.
Figure 7:
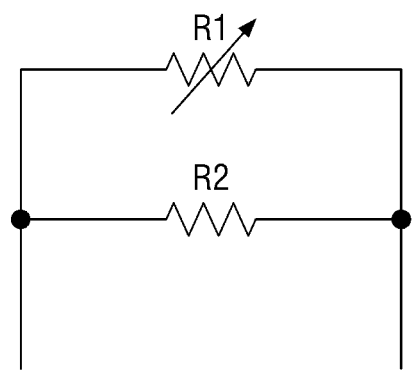
FIG. 7 is a circuit diagram of a pressure sensor according to an exemplary embodiment.

FIG. 3 is an exemplary enlarged plan view illustrating an area A of FIG. 1, FIG. 4 is another enlarged plan view illustrating the area A of FIG. 1, FIG. 5 is a plan view illustrating a second substrate of a pressure sensor according to an exemplary embodiment, FIG. 6 is a cross-sectional view, taken along line I-I' of FIG. 3 or 5, of a pressure sensor according to an exemplary embodiment, and FIG. 7 is a circuit diagram of a pressure sensor according to an exemplary embodiment.

Referring to FIGS. 3 and 5, the pressure sensor 10 may further include a coupling layer CP, which is disposed between the first substrate SUB1 and a second substrate SUB2 to couple the first substrate SUB1 and the second substrate SUB2 together. The coupling layer CP may be formed as a pressure sensitive adhesive (PSA) layer. The coupling layer CP may be disposed along the edges of each of the first and second substrates SUB1 and SUB2. In one embodiment, the coupling layer CP may be formed as a PSA layer. In one embodiment, the coupling layer CP may seal the inside of the pressure sensor 10 by completely surrounding the edges of each of the first and second substrates SUB1 and SUB2. Also, the coupling layer CP can uniformly maintain the gap between the first and second substrates SUB1 and SUB2. In some embodiments, the coupling layer CP may not overlap with the driving line TL, the first and second sensing lines RL1 and RL2, the first and second sensing cells CE1 and CE2, the driving pad TP, and the first and second sensing pads RP1 and RP2.

FIGS. 3 and 5 illustrate that the coupling layer CP is attached to the first substrate SUB1, but the exemplary embodiments are not limited thereto. Alternatively, the coupling layer CP may be attached first to one surface of the first or second substrate SUB1 or SUB2 and may then be attached to one surface of the other substrate in the process of bonding the first and second substrates SUB1 and SUB2 together. Still alternatively, coupling layers CP may be provided on both the first and second substrates SUB1 and SUB2 and may be attached to each other in the process of bonding the first and second substrates SUB1 and SUB2 together.

The first sensing cell CE1 may include a driving connecting electrode TCE, a sensing connecting electrode RCE, first and second driving electrodes TE1 and TE2, which are branched off of the driving connecting electrode TCE, first and second sensing electrodes RE1 and RE2, which are branched off of the sensing connecting electrode RCE, first and second spacers SP1 and SP2, which are disposed between the driving connecting electrode TCE and the sensing connecting electrode RCE, and first and second pressure sensing layers PSL1 and PSL2.

The second sensing cell CE2 may include a driving connecting electrode TCE, a sensing connecting electrode RCE, first and second driving electrodes TE1 and TE2, which are branched off of the driving connecting electrode TCE, first and second sensing electrodes RE1 and RE2, which are branched off of the sensing connecting electrode RCE, and a second pressure sensing layer PSL2.

The driving connecting electrode TCE, the sensing connecting electrode RCE, the first driving electrode TE1, the second driving electrode TE2, the first sensing electrode RE1, the second sensing electrode RE2, the first and second spacers SP1 and SP2, and the second pressure sensing layer PSL2 of each of the first and second sensing cells CE1 and CE2 may be disposed on a surface of the first substrate SUB1 that faces the second substrate SUB2, and the first pressure sensing layer PSL1 of the first sensing cell CE1 may be disposed on a surface of the second substrate SUB2 that faces the first substrate SUB1. However, the exemplary embodiments are not limited to this.

The driving connecting electrode TCE of each of the first and second sensing cells CE1 and CE2 is connected to the driving line TL and the first and second driving electrodes TE1 and TE2 of the corresponding sensing cell. Specifically, an end, in a length direction, i.e., in a second direction (or a Y-axis direction), of the driving connecting electrode TCE of each of the first and second sensing cells CE1 and CE2 is connected to the driving line TL. The first and second driving electrodes TE1 and TE2 of each of the first and second sensing cells CE1 and CE2 may be branched off from the driving connecting electrode TCE of the corresponding sensing cell in a width direction, i.e., in the first direction (or the X-axis direction).

The sensing connecting electrode RCE of the first sensing cell CE1 is connected to the first sensing line RL1 and the first and second sensing electrodes RE1 and RE2 of the first sensing cell CE1, and the sensing connecting electrode RCE of the second sensing cell CE2 is connected to the second sensing line RL2 and the first and second sensing electrodes RE1 and RE2 of the second sensing cell CE2. Specifically, an end, in the length direction, i.e., the second direction (or the Y-axis direction), of the sensing connecting electrode RCE of the first sensing cell CE1 is connected to the first sensing line RL1, an end, in the length direction, i.e., in the second direction (or the Y-axis direction), of the sensing connecting electrode RCE of the second sensing cell CE2 may be connected to the second sensing line RL2, and the first and second sensing electrodes RE1 and RE2 of each of the first and second sensing cells CE1 and CE2 may be branched off of the sensing connecting electrode RCE of the corresponding sensing cell in the opposite direction of the first direction (i.e., in the opposite direction of the X-axis direction).

The first and second driving electrodes TE1 and TE2 and the first and second sensing electrodes RE1 and RE2 of each of the first and second sensing cells CE1 and CE2 may be disposed in the same layer. The first and second driving electrodes TE1 and TE2 and the first and second sensing electrodes RE1 and RE2 of each of the first and second sensing cells CE1 and CE2 may be formed of the same material. For example, the first and second driving electrodes TE1 and TE2 and the first and second sensing electrodes RE1 and RE2 of each of the first and second sensing cells CE1 and CE2 may include a conductive material such as silver (Ag) or copper (Cu). The first and second driving electrodes TE1 and TE2 and the first and second sensing electrodes RE1 and RE2 of each of the first and second sensing cells CE1 and CE2 may be formed by screen printing.

The first driving electrode TE1 and the first sensing electrode RE1 of each of the first and second sensing cells CE1 and CE2 may be disposed adjacent to, but not connected to, each other and may be arranged in parallel.

In some embodiments, the first driving electrode TE1 of each of the first and second sensing cells CE1 and CE2 may include first and second sub-driving electrodes TE1_1 and TE1_2, the first sensing electrode RE1 of each of the first and second sensing cells CE1 and CE2 may include first and second sub-sensing electrodes RE1_1 and RE1_2, and the first sub-sensing electrode RE1_1, the first sub-driving electrode TE1_1, the second sub-sensing electrode RE1_2, and the second sub-driving electrode TE1_2 may be sequentially arranged to alternate with one another in the length direction of the driving connecting electrode TCE or the sensing connecting electrode RCE, i.e., in the second direction (or the Y-axis direction). However, the exemplary embodiments are not limited to this. That is, the numbers and the patterns of arrangement of first driving electrodes TE1 and first sensing electrodes RE1 provided in each of the first and second sensing cells CE1 and CE2 may vary.

The second driving electrode TE2 and the second sensing electrode RE2 of each of the first and second sensing cells CE1 and CE2 may be disposed adjacent to, but not connected to, each other and may be arranged in parallel.

The second sensing electrode RE2 of each of the first and second sensing cells CE1 and CE2 may be disposed between the first and second driving electrodes TE1 and TE2 of the corresponding sensing cell. In this case, the distance between the second driving electrode TE2 and the second sensing electrode RE2 of each of the first and second sensing cells CE1 and CE2 may be smaller than the distance between the first driving electrode TE1 and the first sensing electrode RE1 of each of the first and second sensing cells CE1 and CE2.

Spacers SP may be disposed in the first sensing cell CE1. In some embodiments, first and second spacers SP1 and SP2 may be disposed in the first sensing cell CE1, but the exemplary embodiments are not limited thereto. Alternatively, only one of the first and second spacers SP1 and SP2 may be disposed in the first sensing cell CE1, or not only the first and second spacers SP1 and SP2, but also another spacer(s) SP may be further disposed in the first sensing cell CE1.

The first and second spacers SP1 and SP2 may be disposed on one surface of the first substrate SUB1. For example, the first and second spacers SP1 and SP2 may be disposed on the same substrate as the driving connecting electrode TCE, the sensing connecting electrode RCE, the first and second driving electrodes TE1 and TE2, and the first and second sensing electrodes RE1 and RE2 of the first sensing cell CE1, but the exemplary embodiments are not limited thereto. Alternatively, the first and second spacers SP1 and SP2 may be disposed on the surface of the second substrate SUB2 that faces the first substrate SUB1. Still alternatively, the first spacer SP1 may be disposed on the first substrate SUB1, and the second spacer SP2 may be disposed on the second substrate SUB2.

The first and second spacers SP1 and SP2 may be disposed between the driving connecting electrode TCE and the sensing connecting electrode RCE of the first sensing cell CE1 not to overlap with the first and second driving electrodes TE1 and TE2 and the first and second sensing electrodes RE1 and RE2 of the first sensing cell CE1. For example, the first spacer SP1 may be disposed between the first sub-driving electrode TE1_1 and the second sub-sensing electrode RE1_2 of the first sensing cell CE1, and the second spacer SP2 may be disposed between the second sub-driving electrode TE1_2 and the second sensing electrode RE2 of the first sensing cell CE1. In some embodiments, the first spacer SP1 may be disposed close to the driving connecting electrode TCE of the first sensing cell CE1, and the second spacer SP2 may be disposed close to the sensing connecting electrode RCE of the first sensing cell CE1.

The first spacer SP1 may be spaced apart from the first sub-driving electrode TE1_1 and the second sub-sensing electrode RE1_2 of the first sensing cell CE1, and the second spacer SP2 may be spaced apart from the second sub-driving electrode TE1_2 and the second sensing electrode RE2 of the first sensing cell CE1. However, the exemplary embodiments are not limited to this. Alternatively, the first spacer SP1 may be in contact with the first sub-driving electrode TE1_1 and the second sub-sensing electrode RE1_2 of the first sensing cell CE1, and the second spacer SP2 may be in contact with the second sub-driving electrode TE1_2 and the second sensing electrode RE2 of the first sensing cell CE1.

Each of the first and second spacers SP1 and SP2 may include an organic insulating film or an elastomer. Alternatively, the first and second spacers SP1 and SP2 may be formed of an optically clear adhesive (OCA) or a PSA, in which case, the first and second spacers SP1 and SP2 may have adhesiveness only in parts thereof that are in contact with the first substrate SUB1.

In some embodiments, the first and second spacers SP1 and SP2 may have a rectangular shape in a plan view, but the exemplary embodiments are not limited thereto. Alternatively, the first and second spacers SP1 and SP2 may have various shapes other than a rectangular shape, such as a circular shape or a triangular shape in a plan view. Also, the first and second spacers SP1 and SP2 may have the same shape, but the exemplary embodiments are not limited thereto. Alternatively, the first and second spacers SP1 and SP2 may have different shapes.

The first and second spacers SP1 and SP2 may be symmetrical with each other with respect to the center of the first sensing cell CE1, but the exemplary embodiments are not limited thereto. Alternatively, the first and second spacers SP1 and SP2 may be asymmetrical with each other with respect to the center of the first sensing cell CE1. Also, the first and second spacers SP1 and SP2 may be disposed to overlap with the first pressure sensing layer PSL1, which will be described later, in a thickness direction, i.e., in a third direction (or a Z-axis direction). Accordingly, in response to pressure being applied to the pressure sensor 10, the first pressure sensing layer PSL1 may be placed in contact with the first driving electrode TE1, the first sensing electrode RE1, and the first and second spacers SP1 and SP2 of the first sensing cell CE1. Also, in response to the pressure applied to the pressure sensor 10 disappearing, the first and second spacers SP1 and SP2 help the first pressure sensing layer PSL1 return to its initial state and can thus improve the reliability of the pressure sensor 10. The restoration of the pressure sensor 10 to its initial resistance by the first and second spacers SP1 and SP2 will be described later.

The second sensing cell CE2 detects a resistance variation caused by temperature. Since the first pressure sensing layer PSL1 is not disposed in the second sensing cell CE2, the restorability of the pressure sensor 10 to its initial resistance is not much of an issue in the second sensing cell CE2. Thus, no spacers SP are disposed in the second sensing cell CE2, but the exemplary embodiments are not limited thereto. Alternatively, as illustrated in FIG. 4, spacers SP may be disposed in the second sensing cell CE2. Specifically, first and second spacers SP1 and SP2 may be disposed in the second sensing cell CE2, like in the first sensing cell CE1.

The locations of the first and second spacers SP1 and SP2 in the second sensing cell CE2 may be the same as the locations of the first and second spacers SP1 and SP2 in the first sensing cell CE1, but the exemplary embodiments are not limited thereto. That is, the locations of the first and second spacers SP1 and SP2 in the second sensing cell CE2 may be different from the locations of the first and second spacers SP1 and SP2 in the first sensing cell CE1.

The first and second spacers SP1 and SP2 in the second sensing cell CE2 do not necessarily help the pressure sensor 10 return to its initial resistance, but can address the problems associated with the selectively forming of the first and second spacers SP1 and SP2 only in the first sensing cell CE1. Also, any discrepancies in the resistance detected by the first sensing cell CE1 between temperatures can be precisely compensated for by forming the second sensing cell CE2 to have a similar structure to the first sensing cell CE1.

Referring again to FIG. 5, the first pressure sensing layer PSL1 is disposed on the surface of the second substrate SUB2 that faces the first substrate SUB1. The first pressure sensing layer PSL1 may be disposed to overlap the first sensing cell CE1 in the thickness direction, i.e., in the third direction (or the Z-axis direction). Specifically, the first pressure sensing layer PSL1 may be disposed to overlap with the first driving electrode TE1, the first sensing electrode RE1, and the first and second spacers SP1 and SP2 of the first sensing cell CE1 in the thickness direction, i.e., in the third direction (or the Z-axis direction).

The first pressure sensing layer PSL1 may include a pressure sensitive material and a polymer resin in which the pressure sensitive material is disposed. The pressure sensitive material may be fine particles (or nano-particles) of a metal such as nickel (Ni), aluminum (Al), titanium (Ti), tin (Sb), or Cu. For example, the first pressure sensitive layer PSL1 may include a quantum tunneling composite (QTC).

The second driving electrode TE2 and the second sensing electrode RE2 of each of the first and second sensing cells CE1 and CE2 may not overlap with the first pressure sensing layer PSL1.

Referring again to FIG. 3, the second pressure sensing layer PSL2 of each of the first and second sensing cells CE1 and CE2 may be disposed on the second driving electrode TE2 and the second sensing electrode RE2 of the corresponding sensing cell. In some embodiments, the second pressure sensing layer PSL2 of each of the first and second sensing cells CE1 and CE2 may be disposed on the first substrate SUB1 to cover the second driving electrode TE2 and the second sensing electrode RE2 of the corresponding sensing cell. For example, the second pressure sensing layer PSL2 of each of the first and second sensing cells CE1 and CE2 may be disposed to cover the top surface and the sides of each of the second driving electrode TE2 and the second sensing electrode RE2 of the corresponding sensing cell. Accordingly, the second driving electrode TE2 and the second sensing electrode RE2 of each of the first and second sensing cells CE1 and CE2 can be connected via the second pressure sensing layer PSL2 of the corresponding sensing cell. However, the exemplary embodiments are not limited to this. In another example, the second pressure sensing layer PSL2 of each of the first and second sensing cells CE1 and CE2 may be disposed to cover only the sides of each of the second driving electrode TE2 and the second sensing electrode RE2 of the corresponding sensing cell, in which case, the top surfaces of the second driving electrode TE2 and the second sensing electrode RE2 of each of the first and second sensing cells CE1 and CE2 may be exposed.

The second pressure sensing layer PSL2 of each of the first and second sensing cells CE1 and CE2 may be formed of the same material as the first pressure sensing layer PSL1 of the first sensing cell CE1. In this case, the second pressure sensing layer PSL2 of each of the first and second sensing cells CE1 and CE2 may include a pressure sensitive material and a polymer resin in which the pressure sensitive material is disposed. The pressure sensitive material may be fine particles of a metal such as Ni, Al, Ti, Sb, or Cu. For example, the second pressure sensitive material PSL2 of each of the first and second sensing cells CE1 and CE2 may include a QTC.

Referring to FIG. 6, the first and second pressure sensing layers PSL1 and PSL2 of the first sensing cell CE1 are disposed on different substrates. For example, the first pressure sensing layer PSL1 of the first sensing cell CE1 may be disposed on the bottom surface of the second substrate SUB2 that faces the first substrate SUB1, and the second pressure sensing layer PSL2 of the first sensing cell CE1 may be disposed on the surface of the first substrate SUB1 that faces the second substrate SUB2.

The first sensing cell CE1 may include a first area AS1 whose resistance varies in accordance with pressure and a second area AS2 whose resistance is fixed regardless of pressure.

The first pressure sensing layer PSL1 of the first sensing cell CE1 may be disposed in the first area AS1 to overlap with the first driving electrode TE1, the first sensing electrode RE1, and the first spacer SP1 of the first sensing cell CE1 in the thickness direction, i.e., in the third direction (or the Z-axis direction). Although not specifically illustrated, the second spacer SP2 of the first sensing cell CE1 may also be disposed in the first area AS1 of the first sensing cell CE1.

The second pressure sensing layer PSL2, the second driving electrode TE2, and the second sensing electrode RE2 of the first sensing cell CE1 may be disposed in the second area AS2 of the first sensing cell CE1. Also, the second pressure sensing layer PSL2 of the first sensing cell CE1 may be disposed on the first substrate SUB1 to cover the second driving electrode TE2 and the second sensing electrode RE2 of the first sensing cell CE1. FIG. 6 illustrates that there exist one second driving electrode TE2 and one second sensing electrode RE2 in the second area AS2 of the first sensing cell CE1, but the exemplary embodiments are not limited thereto. Alternatively, in the second area AS2 of the first sensing cell CE2, multiple second driving electrodes TE2 and multiple second sensing electrodes RE2 may be disposed on the surface of the first substrate SUB1 that faces the second substrate SUB2, in which case, the second pressure sensing layer PSL2 may cover all the multiple second driving electrodes TE2 and all the multiple second sensing electrodes RE2.

The first and second areas AS1 and AS2 of the first sensing cell CE1 may be spaced apart from each other, but the exemplary embodiments are not limited thereto. The first and second areas AS1 and AS2 of the first sensing cell CE1 may be connected to each other.

In some embodiments, the first sub-sensing electrode RE1_1 may have a first width W1, the first sub-driving electrode TE1_1 may have a second width W2, which is the same as the first width W1, and the first spacer SP1 may have a third width W3, which is greater than the first and second widths W1 and W2. However, the exemplary embodiments are not limited to this. Alternatively, the third width W3 may be smaller than the first and second widths W1 and W2 or may be the same as the first and second widths W1 and W2.

The first sub-sensing electrode RE1_1, the second sub-sensing electrode RE1_2, and the second sensing electrode RE2 may have the same width, and the first sub-driving electrode TE1_1, the second sub-driving electrode TE1_2, and the second driving electrode TE2 may have the same width. However, the exemplary embodiments are not limited to this. The first sub-sensing electrode RE1_1, the second sub-sensing electrode RE1_2, and the second sensing electrode RE2 may have different widths, and the first sub-driving electrode TE1_1, the second sub-driving electrode TE1_2, and the second driving electrode TE2 may have different widths.

In some embodiments, the first sub-sensing electrode RE1_1 may have a first height H1, the first sub-driving electrode TE1_1 may have a second height H2, which is the same as the first height H1, and the first spacer SP1 may have a third height H3, which is greater than the first and second heights H1 and H2. However, the exemplary embodiments are not limited to this. Alternatively, the third height H3 may be the same as the first and second heights H1 and H2. In order to effectively improve the restorability of the pressure sensor 10 to its initial state, the third height H3 may preferably be 1 or 2 μm greater than the first or second height H1 or H2.

The first sub-sensing electrode RE1_1, the second sub-sensing electrode RE1_2, and the second sensing electrode RE2 may have the same height, and the first sub-driving electrode TE1_1, the second sub-driving electrode TE1_2, and the second driving electrode TE2 may have the same height. However, the exemplary embodiments are not limited to this. Alternatively, the first sub-sensing electrode RE1_1, the second sub-sensing electrode RE1_2, and the second sensing electrode RE2 may have different heights, and the first sub-driving electrode TE1_1, the second sub-driving electrode TE1_2, and the second driving electrode TE2 may have different heights.

Referring to FIG. 7, the first sensing cell CE1 may include first and second resistances R1 and R2, which are connected in parallel between the driving line TL and the first sensing line RL1. The first resistance R1 refers to the resistance generated in the first area AS1, and the second resistance R2 refers to the resistance generated in the second area AS2. Since the contact area of the first pressure sensing layer PSL1 and the first driving electrode TE1 of the first sensing cell CE1 and the contact area of the first pressure sensing layer PSL1 and the first sensing electrode RE1 of the first sensing cell CE1 vary depending on pressure, the first resistance R1 may be a variable resistance. In this case, resistance R of the first sensing cell CE1 may be calculated by Equation (1):

$$\frac{1}{R} = \frac{1}{R1} + \frac{1}{R2}. \tag{1}$$

Equation (1) may be rewritten as Equation (2):

$$R = \frac{R1 \times R2}{R1 + R2}. \tag{2}$$

A variation in the first resistance R1, i.e., a resistance variation ΔR in the first sensing cell CE1, may be calculated by Equation (3):

$$\Delta R = R2 - R = \frac{R2^2}{R1 + R2}. \tag{3}$$

The first sensing cell CE1 may include the first resistance R1, which varies in accordance with pressure, and the second resistance R2, which is defined by the second pressure sensing layer PSL2 that is in contact with the second driving electrode TE2 and the second sensing electrode RE2 of the first sensing cell CE1. That is, since the first sensing cell CE1 includes the second resistance R2, which is not related to the pressure applied to the pressure sensor 10, the resistance R of the first sensing cell CE1 may be lowered. Although not specifically illustrated, the second sensing cell CE2 may also include a second resistance R2 which is not related to temperature, and thus, resistance R of the second sensing cell CE2 may also be lowered. Accordingly, the range of resistances of the first sensing cell CE1 that the pressure sensing unit FD is to detect can be reduced.

Since the second driving electrode TE2 and the second sensing electrode RE2 of the first sensing cell CE1 are connected to the second pressure sensing layer PSL2 of the first sensing cell CE1 to form the second resistance R2 of the first sensing cell CE1, there is no need to provide many second driving electrodes TE2 and many second sensing electrodes RE2. On the other hand, multiple driving electrodes TE1 and multiple first sensing electrodes RE1 may preferably be formed because they are for detecting pressure depending on their contact areas with the first pressure sensing layer PSL1 of the first sensing cell CE1. The number of second driving electrodes TE2 of the first sensing cell CE1 may be smaller than the number of first driving electrodes TE1 of the first sensing cell CE1, and the number of second sensing electrodes RE2 of the first sensing cell CE1 may be smaller than the number of first sensing electrodes RE1 of the first sensing cell CE1.

As the heights of the second driving electrode TE2 and the second sensing electrode RE2 increase, the second resistance R2 of the first sensing cell CE1 may decrease. Also, the widths of the second driving electrode TE2 and the second sensing electrode RE2 increase, the second resistance R2 of the first sensing cell CE1 may decrease. As the numbers of second driving electrodes TE2 and second sensing electrodes RE2 that are in contact with the second pressure sensing layer PSL2 of the first sensing cell CE1 increase, the second resistance R2 of the first sensing cell CE1 may decrease because the contact areas of the second pressure sensing layer PSL2 and the second driving electrode TE2 and of the second pressure sensing layer PSL2 and the second sensing electrode RE2 increase. As the contact area of the second pressure sensing layer PSL2 and the second driving electrodes TE2 of the first sensing cell CE1 and the contact area of the second pressure sensing layer PSL2 and the second sensing electrodes RE2 of the first sensing cell CE1 increase, the second resistance R2 of the first sensing cell CE1 may decrease. Therefore, the second resistance R2 of the first sensing cell CE1 may be designed in consideration of the height and width of the second driving electrode TE, the height and width of the second sensing electrode RE2, the numbers of second driving electrodes TE2 and second sensing electrodes RE2, and the contact areas of the second pressure sensing layer PSL2 and the second driving electrode TE2 and of the second pressure sensing layer PSL2 and the second sensing electrode RE2.

Figure 8:
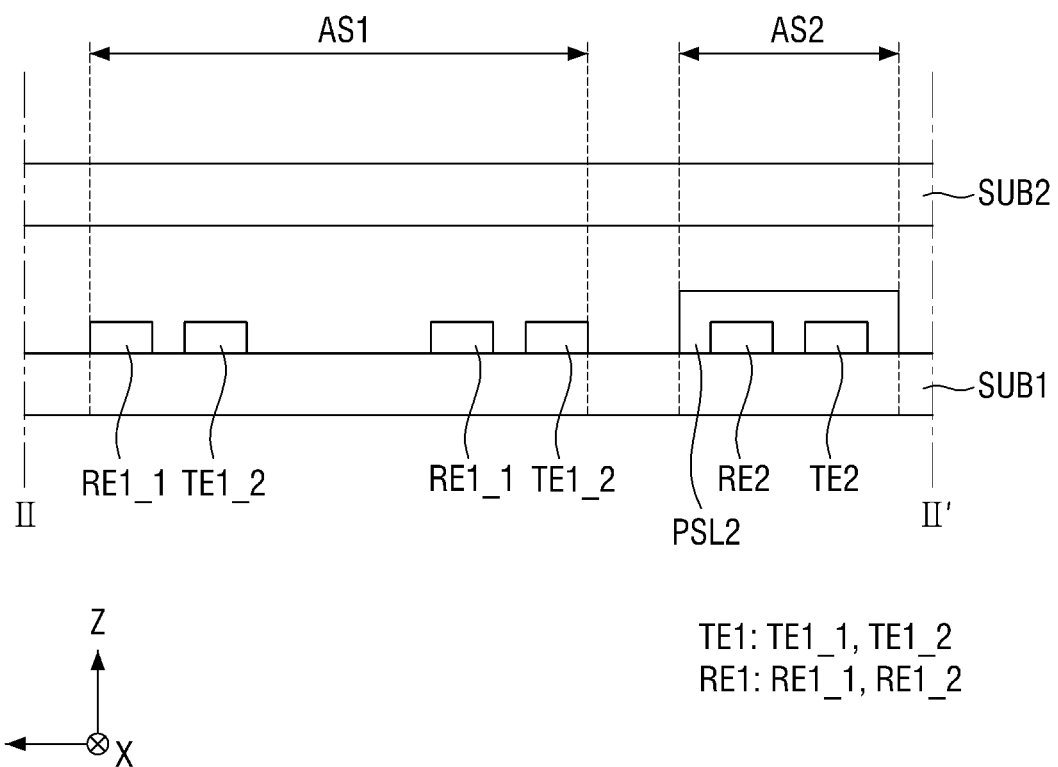
FIG. 8 is a cross-sectional view, taken along line II-II' of FIG. 3 or 5, of a pressure sensor according to an exemplary embodiment.

FIG. 8 is a cross-sectional view, taken along line II-II' of FIG. 3 or 5, of a pressure sensor according to an exemplary embodiment. As already mentioned above, the second sensing cell CE2 only differs from the first sensing cell CE1 in that the first pressure sensing layer PSL1 and the first and second spacers SP1 and SP2 are not provided therein, and thus, a detailed description thereof will be omitted.

Figure 9:
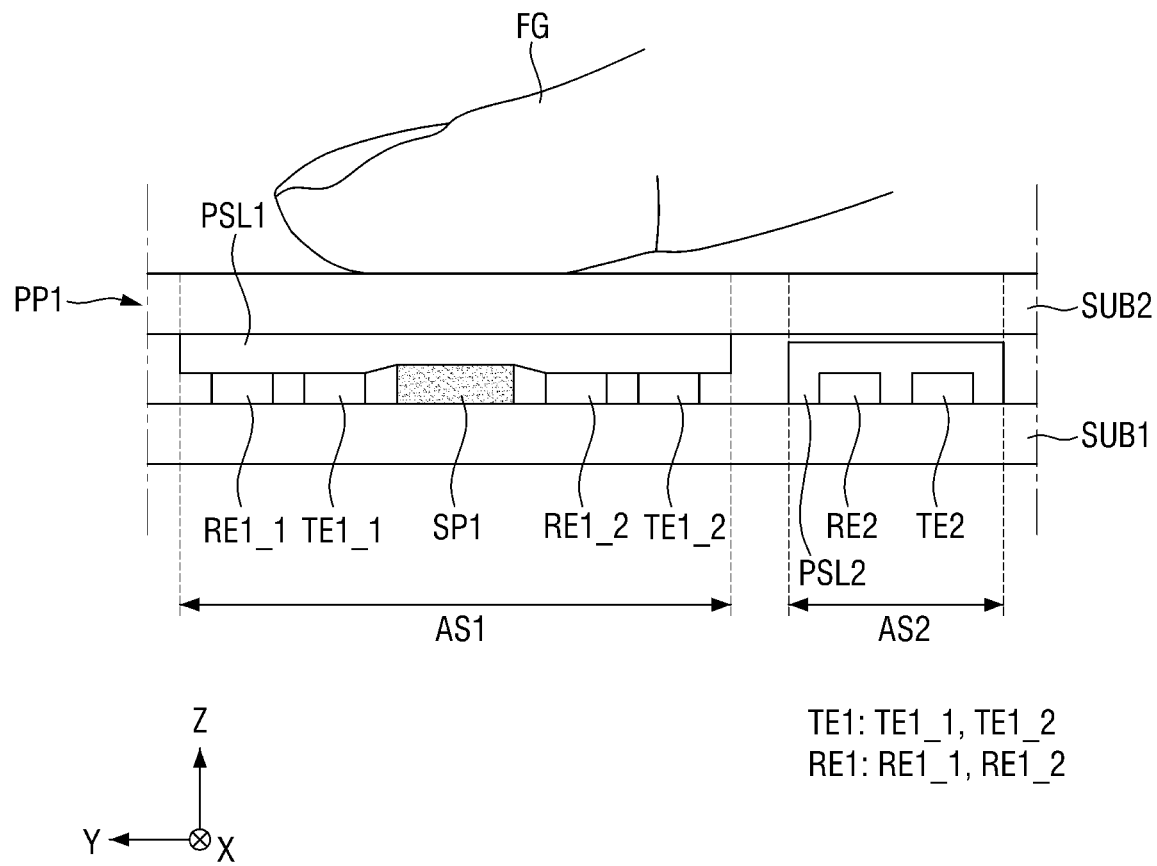
FIG. 9 is a cross-sectional view illustrating a case where a user presses a pressure sensor according to an exemplary embodiment with a finger.
Figure 10:
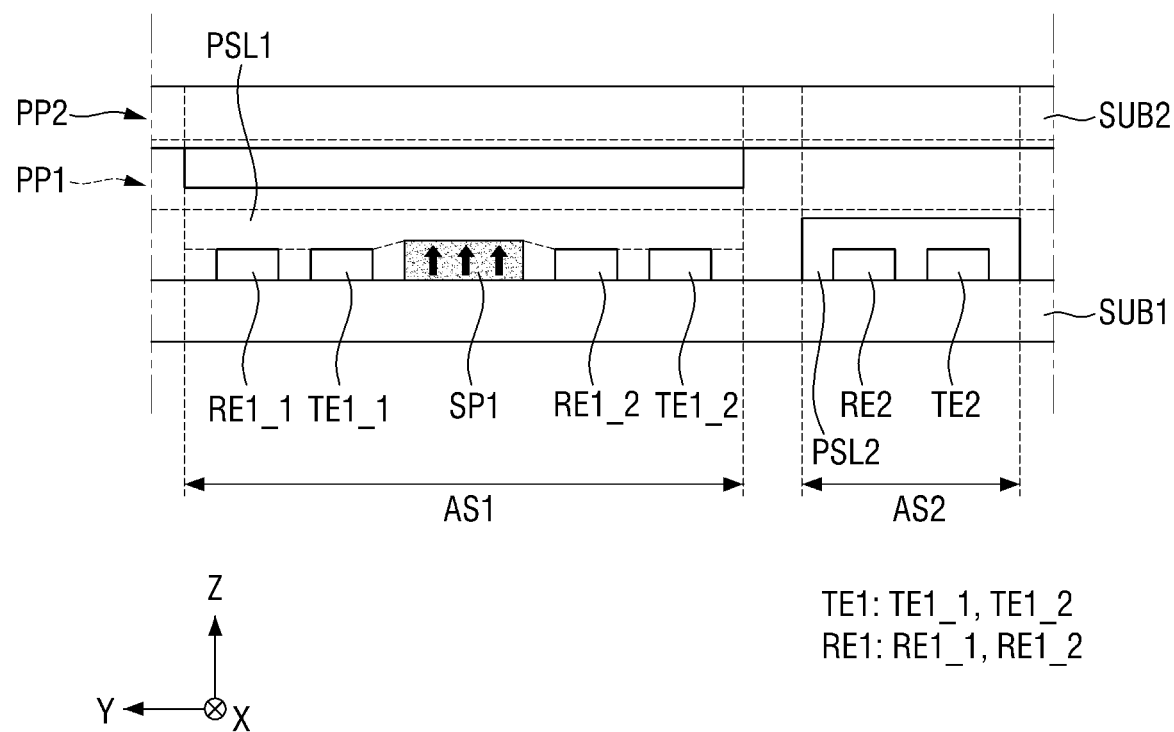
FIG. 10 is a cross-sectional view illustrating how a pressure sensor according to an exemplary embodiment is restored after the pressure applied by a user disappears.

FIG. 9 is a cross-sectional view illustrating a case where a user presses a pressure sensor according to an exemplary embodiment with a finger, and FIG. 10 is a cross-sectional view illustrating how a pressure sensor according to an exemplary embodiment is restored after the pressure applied by a user disappears. As already mentioned above, the second sensing cell CE2 is not a cell for detecting pressure. Thus, in the description that follows, the pressure sensor 10 may refer to the first sensing cell CE1 of the pressure sensor 10.

Referring to FIG. 9, in response to a user pressing the pressure sensor 10 in the opposite direction of the third direction (i.e., in the opposite direction of the Z-axis direction) with a finger FG, the second substrate SUB2 of the pressure sensor 10 may be lowered toward the first substrate SUB1, and as a result, the first pressure sensing layer PSL1 of the first sensing cell CE1 may be placed in contact with the first driving electrode TE1 and the first sensing electrode RE1 of the first sensing cell CE1 ("PP1"). As already mentioned above, the height of the first spacer SP1 is 1 or 2 µm greater than, or the same as, the heights of the first driving electrode TE1 and the first sensing electrode RE1. Thus, even if the first spacer SP1 is disposed on the first substrate SUB1, the first pressure sensing layer PSL1 can be properly placed in contact with the first driving electrode TE1 and the first sensing electrode RE1 in response to pressure being applied thereto.

As the first pressure sensing layer PSL1 is placed in contact with the first driving electrode TE1 and the first sensing electrode RE1, the first driving electrode TE1 and the first sensing electrode RE1 may be physically connected via the first pressure sensing layer PSL1, and the first pressure sensing layer PSL1 may serve as a resistor. Also, since the contact areas of the first pressure sensing layer PSL1 and the first driving electrode TE1 and of the first pressure sensing layer PSL1 and the first sensing electrode RE1 vary depending on pressure applied to the pressure sensor 10, the resistance of the first sensing cell CE1 varies. Accordingly, the pressure sensing unit FD can detect the pressure applied to the pressure sensor 10 by the finger FG of the user by applying a driving voltage to the driving line TL of the pressure sensor 10 and detecting a current value or a voltage value, resulting from a resistance variation, via the sensing line RL of the pressure sensor 10.

Referring to FIG. 10, in response to the pressure applied from the top of the pressure sensor 10 toward the second substrate SUB2 (i.e., in the opposite direction of the Z-axis direction) disappearing, the second substrate SUB2 may be lifted in the third direction (or the Z-axis direction). Accordingly, the first pressure sensing layer PSL1 is restored to its initial state while being spaced apart from the first driving electrode TE1, the first sensing electrode RE1, and the first spacer SP1 ("PP2").

The restorability of the first pressure sensing layer PSL1 is due to the coupling layer CP. Since the coupling layer CP is disposed along the edges of each of the first and second substrates SUB1 and SUB2, the second substrate SUB2 and the first pressure sensing layer PSL1 of the pressure sensor 10 may not be able to be properly restored to their initial state if pressure is applied thereto for a long period of time, and as a result, the initial resistance of the pressure sensor 10 may be changed. This initial resistance change may cause the malfunction of the pressure sensor 10, which detects pressure based on its initial resistance. The first spacer SP1, which is disposed in the first area AS1 of the pressure sensor 10, as illustrated in FIG. 10, can deliver a force to the first pressure sensing layer PSL1 in an upward direction (or the Z-axis direction) and can thus supplement the restoring force of the pressure sensor 10. In some embodiments, the first spacer SP1 and the first pressure sensing layer PSL1 may be in partial contact with each other. Even when the first spacer SP1 and the first pressure sensing layer PSL1 are in partial contact with each other, the pressure sensing layer PSL1 can be sufficiently spaced apart from the first sensing electrode RE1 and the first driving electrode TE1 due to the height of the first spacer SP1, and as a result, the pressure sensor 10 can be restored to its initial resistance. Since the second substrate SUB2 and the first pressure sensing layer PSL1 of the pressure sensor 10 can be stably restored to their initial state even after the pressure sensor 10 is pressed for a long period of time, the malfunction of the pressure sensor 10 that may be caused by a change in the initial resistance of the pressure sensor 10 can be prevented.

Figure 11:
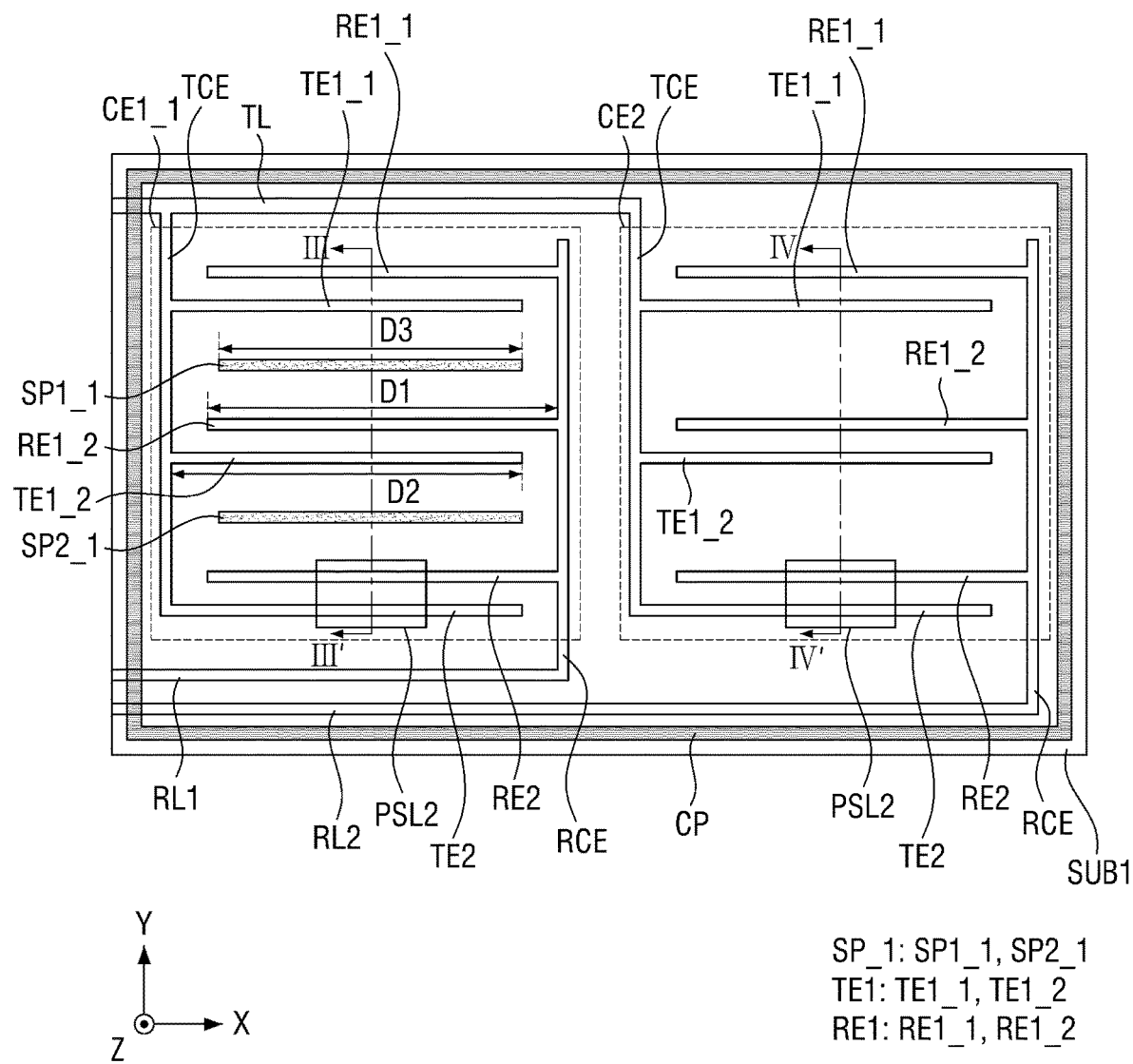
FIG. 11 is another exemplary enlarged plan view of the area A of FIG. 1.
Figure 12:
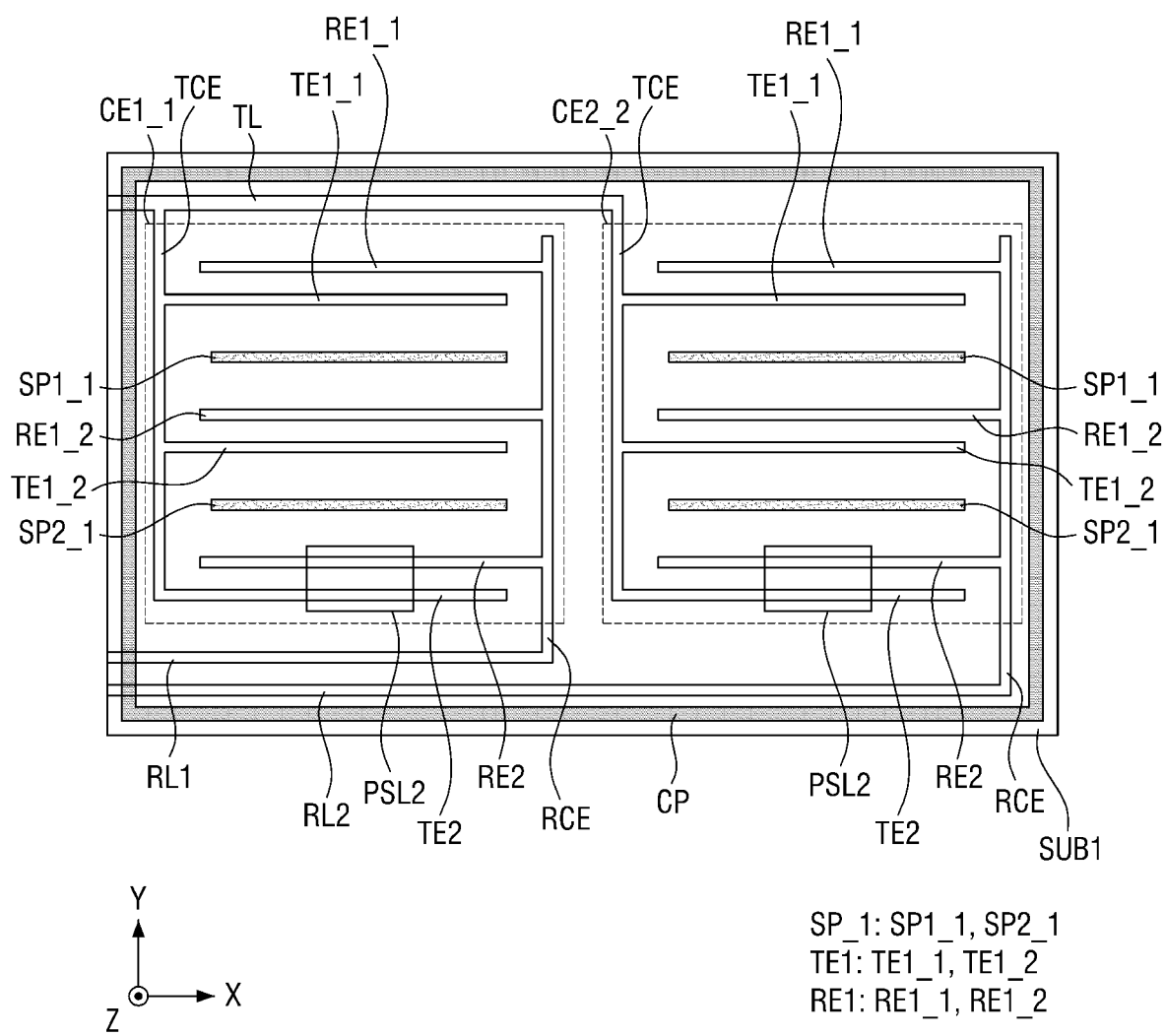
FIG. 12 is another exemplary enlarged plan view of the area A of FIG. 1.
Figure 13:
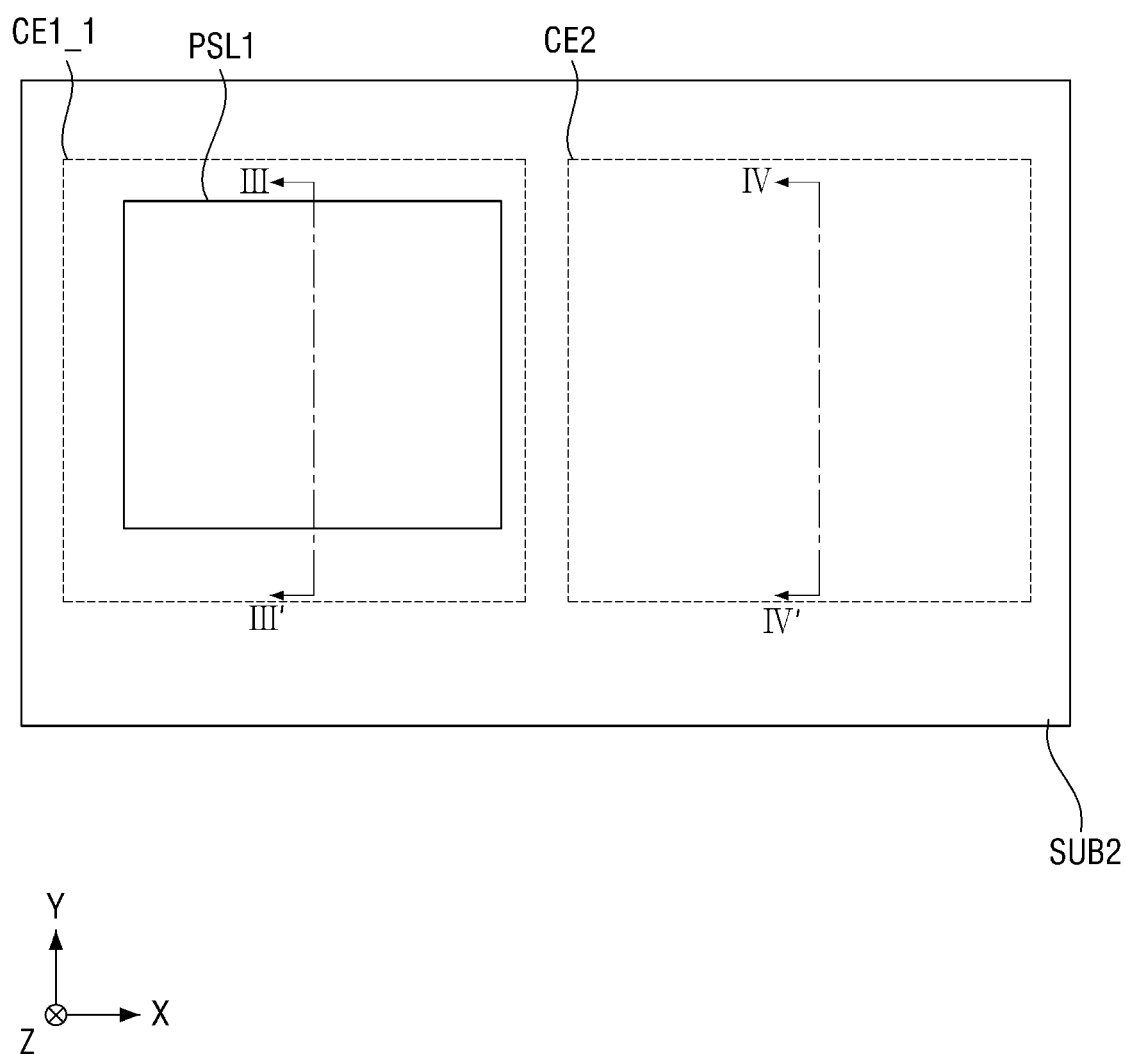
FIG. 13 is a plan view illustrating a second substrate of a pressure sensor according to an exemplary embodiment.
Figure 14:
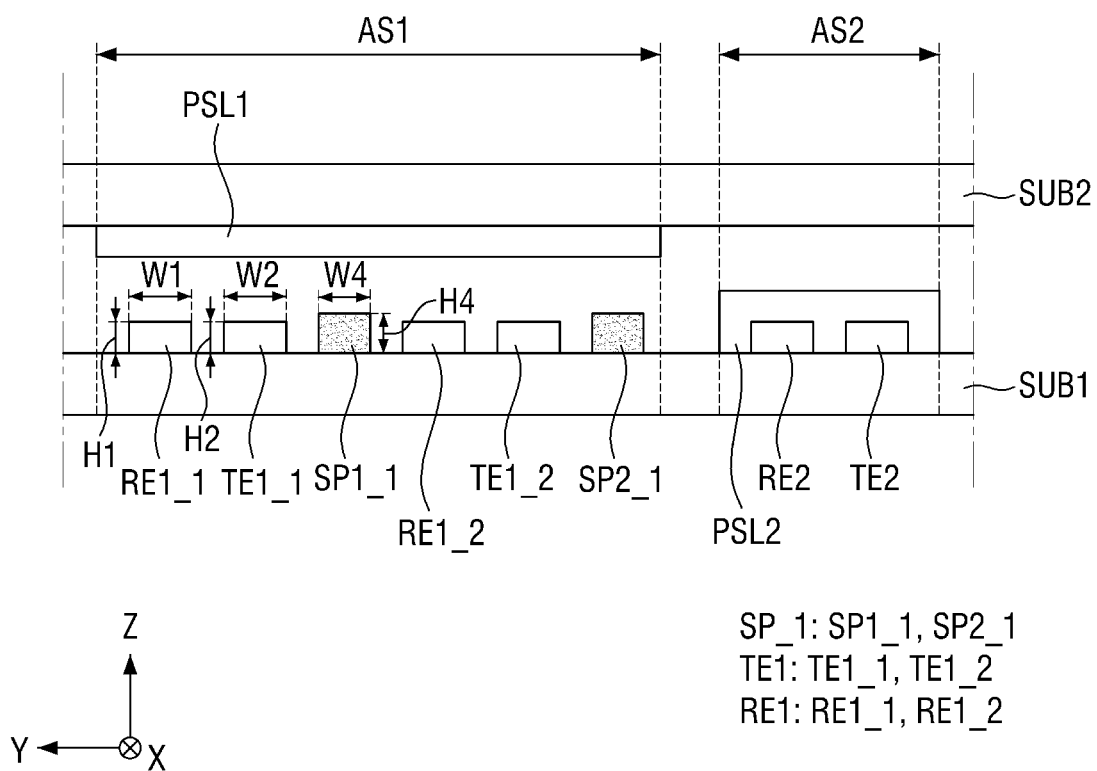
FIG. 14 is a cross-sectional view, taken along line III-III' of FIG. 11 or 13, of a pressure sensor according to an exemplary embodiment.
Figure 15:
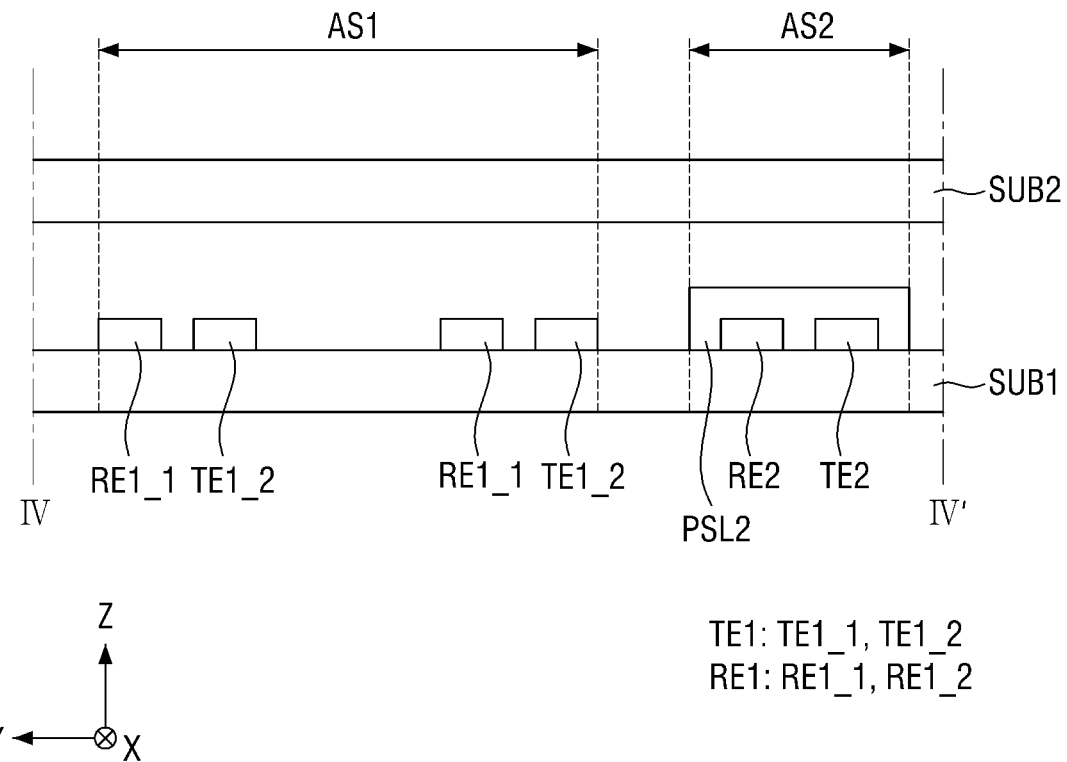
FIG. 15 is a cross-sectional view, taken along line IV-IV' of FIG. 11 or 13, of a pressure sensor according to an exemplary embodiment.

FIG. 11 is another exemplary enlarged plan view of the area A of FIG. 1, FIG. 12 is another exemplary enlarged plan view of the area A of FIG. 1, FIG. 13 is a plan view illustrating a second substrate of a pressure sensor according to an exemplary embodiment, FIG. 14 is a cross-sectional view, taken along line III-III' of FIG. 11 or 13, of a pressure sensor according to an exemplary embodiment, and FIG. 15 is a cross-sectional view, taken along line IV-IV' of FIG. 11 or 13, of a pressure sensor according to an exemplary embodiment. The embodiments of FIGS. 11 through 15 differ from the embodiments of FIGS. 3 through 8 in the shape and the arrangement of spacers. The embodiments of FIGS. 11 through 15 will hereinafter be described, focusing mainly on the differences with the embodiments of FIGS. 3 through 8.

Referring to FIGS. 11 and 13, in some embodiments, spacers SP_1 are disposed in a first sensing cell CE1_1. For example, first and second spacers SP1_1 and SP2_1 may be disposed in the first sensing cell CE1_1, but the exemplary embodiments are not limited thereto. Alternatively, only one of the first and second spacers SP1_1 and SP2_1 may be disposed in the first sensing cell CE1_1, or not only the first and second spacers SP1_1 and SP2_1, but also another spacer(s) SP_1 may be further disposed in the first sensing cell CE1_1.

The first and second spacers SP1_1 and SP2_1 may be disposed on one surface of a first substrate SUB1, but the exemplary embodiments are not limited thereto. Alternatively, the first and second spacers SP1_1 and SP2_1 may be disposed on a surface of a second substrate SUB2 that faces the first substrate SUB1. Still alternatively, the first spacer SP1_1 may be disposed on the first substrate SUB1, and the second spacer SP2_1 may be disposed on the second substrate SUB2.

The first and second spacers SP1_1 and SP2_1 may be disposed between a driving connecting electrode TCE and a sensing connecting electrode RCE of the first sensing cell CE1_1 and may be formed as bars, but the exemplary embodiments are not limited thereto. Alternatively, the first and second spacers SP1_1 and SP2_1 may include curved portions or recessed portions. Still alternatively, the first and second spacers SP1_1 and SP2_1 may have different shapes.

The first and second spacers SP1_1 and SP2_1 may be disposed not to overlap with first and second driving electrodes TE1 and TE2 and first and second sensing electrodes RE1 and RE2 of the first sensing cell CE1_1 in a plan view. For example, the first spacer SP1_1 may be disposed between a first sub-driving electrode TE1_1 and a second sub-sensing electrode RE1_2, and the second spacer SP2_1 may be disposed between a second sub-driving electrode TE1_2 and the second sensing electrode RE2. However, the exemplary embodiments are not limited to this. Alternatively, the spacers SP_1 may be disposed between parts of the first sensing electrode RE1 and parts of the first driving electrode TE1. For example, the spacers SP_1 may be disposed between a first sub-sensing electrode RE1_1 and the first sub-driving electrode TE1_1, between the first sub-driving electrode TE1_1 and a second sub-sensing electrode RE1_2, between the second sub-sensing electrode RE1_2 and the second sub-driving electrode TE1_2, and between the second sub-driving electrode TE1_2 and the second sensing electrode RE2.

The first sensing electrode RE may have a first length D1 in a first direction (or an X-axis direction), the first driving electrode TE1 may have a second length D2, which is the same as the first length D1, in the first direction (or the X-axis direction), and the spacers SP_1 may have a third length D3, which is smaller than the first and second lengths D1 and D2, in the first direction (or the X-axis direction). That is, the spacers SP_1 may be shorter than the first sensing electrode RE1 and the first driving electrode TE1 in the first direction (or the X-axis direction). However, the exemplary embodiments are not limited to this. Alternatively, the spacers SP_1 may be as long as, or longer than, the first sensing electrode RE1 and the first driving electrode TE1 in the first direction (or the X-axis direction).

A second sensing cell CE2 detects a resistance variation caused by temperature, and the restorability of a pressure sensor 10 to its initial resistance is not much of an issue in the second sensing cell CE2. Thus, no spacers SP_1 are disposed in the second sensing cell CE2, but the exemplary embodiments are not limited thereto. Alternatively, as illustrated in FIG. 12, spacers SP_1 may be disposed in a second sensing cell CE2_2. Specifically, referring to FIG. 12, first and second spacers SP1_1 and SP2_1 may be disposed in the second sensing cell CE2_2, like in a first sensing cell CE1_1.

The locations of the first and second spacers SP1_1 and SP2_1 in the second sensing cell CE2_2 may be the same as the locations of the first and second spacers SP1_1 and SP2_1 in the first sensing cell CE1_1, but the exemplary embodiments are not limited thereto. That is, the locations of the first and second spacers SP1_1 and SP2_1 in the second sensing cell CE2_2 may be different from the locations of the first and second spacers SP1_1 and SP2_1 in the first sensing cell CE1_1.

Referring to FIG. 14, the first sensing cell CE1_1 may include first and second areas AS1 and AS2. The second area AS2 of the first sensing cell CE1_1 is the same as its counterpart of FIG. 6, and thus, a detailed description thereof will be omitted.

In the first area AS1 of the first sensing cell CE1_1, a first pressure sensing layer PSL1 may be disposed to overlap with the first driving electrode TE1, the first sensing electrode RE1, the first spacer SP1_1, and the second spacer SP2_1 in a third direction (or a Z-axis direction).

In some embodiments, a first sub-sensing electrode RE1_1 may have a first width, a first sub-driving electrode RE1_1 may have a second width W2, which is the same as the first width W1, and the first spacer SP1_1 may have a fourth width W4, which is smaller than the first and second widths W1 and W2.

The first sub-sensing electrode RE1_1, the second sub-sensing electrode RE1_2, and a second sensing electrode RE2 may have the same width, the first sub-driving electrode TE1_1, the second sub-driving electrode TE1_2, and the second driving electrode TE2 may have the same width, and the first and second spacers SP1_1 and SP2_1 may have the same width. However, the exemplary embodiments are not limited to this. When the width of the spacers SP_1 is smaller than the widths of the first sensing electrode RE1 and the first driving electrode TE1, the first pressure sensing layer PSL1 can be easily placed in contact with the first sensing electrode RE1 and the first driving electrode TE1 in response to pressure being applied thereto.

In some embodiments, the first sub-sensing electrode RE1_1 may have a first height H1, the first sub-driving electrode TE1_1 may have a second height H2, which is the same as the first height H1, and the first spacer SP1_1 may have a fourth height H4, which is greater than the first and second heights H1 and H2. However, the exemplary embodiments are not limited to this. Alternatively, the fourth height H4 may be the same as the first and second heights H1 and H2.

The first sub-sensing electrode RE1_1, the second sub-sensing electrode RE1_2, and the second sensing electrode RE2 may have the same height, the first sub-driving electrode TE1_1, the second sub-driving electrode TE12_2, and the second driving electrode TE2 may have the same height, and the first and second spacers SP1_1 and SP2_1 may have the same height. However, the exemplary embodiments are not limited to this. When the height of the spacers SP_1 is greater than the heights of the first sensing electrode RE1 and the first driving electrode TE1, the first pressure sensing layer PSL1 and a second substrate SUB2 can be easily restored to their initial state after the pressure applied thereto disappears. Accordingly, the height of the spacers SP_1 may preferably be 1 or 2 μm greater than the heights of the first sensing electrode RE1 and the first driving electrode TE1.

Referring to FIG. 15, the second sensing cell CE2 only differs from the first sensing cell CE1_1 in that the first pressure sensing layer PSL1 and the first and second spacers SP1_1 and SP2_1 are not provided therein, and thus, a detailed description thereof will be omitted.

Figure 16:
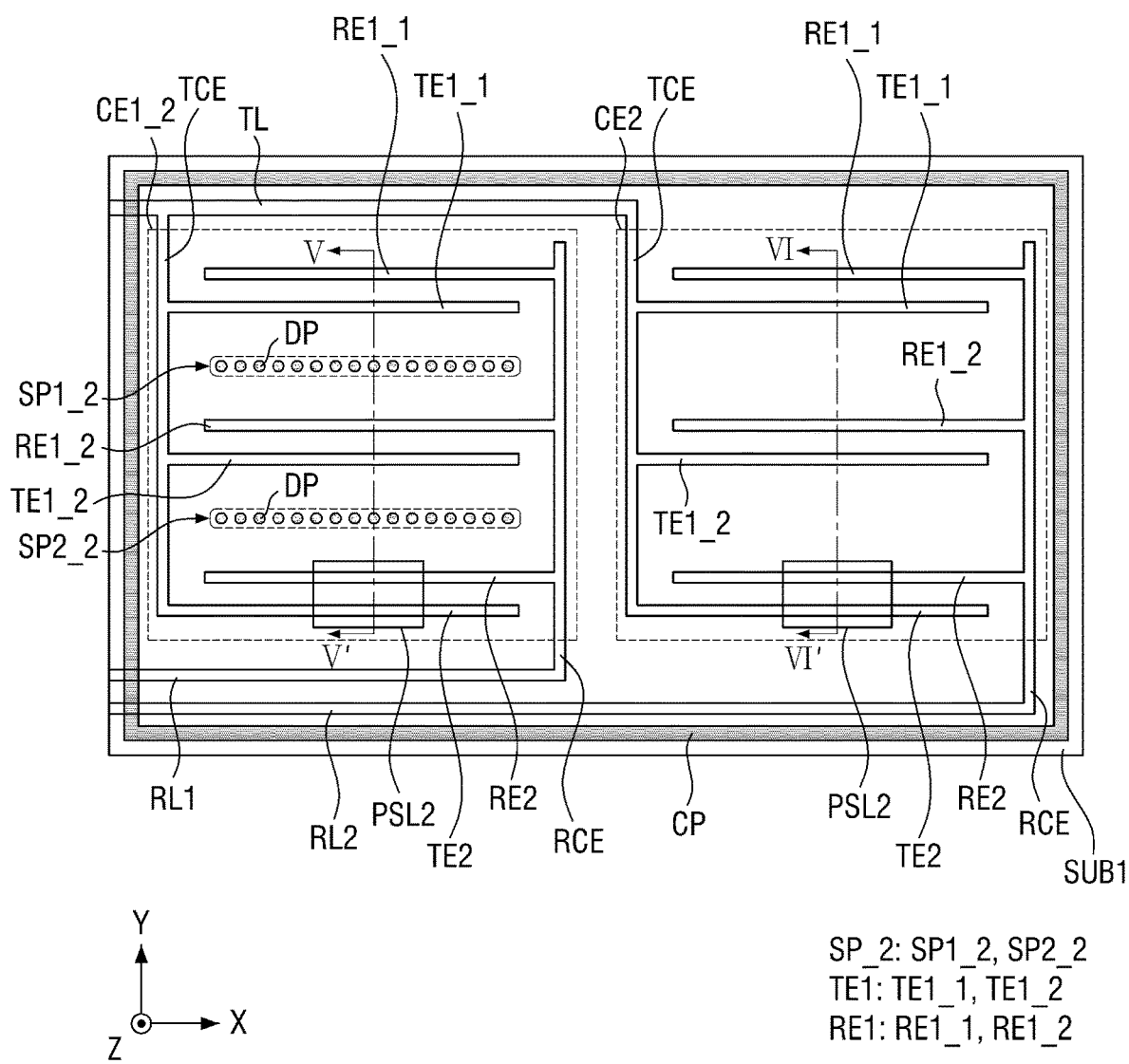
FIG. 16 is another exemplary enlarged plan view of the area A of FIG. 1.
Figure 17:
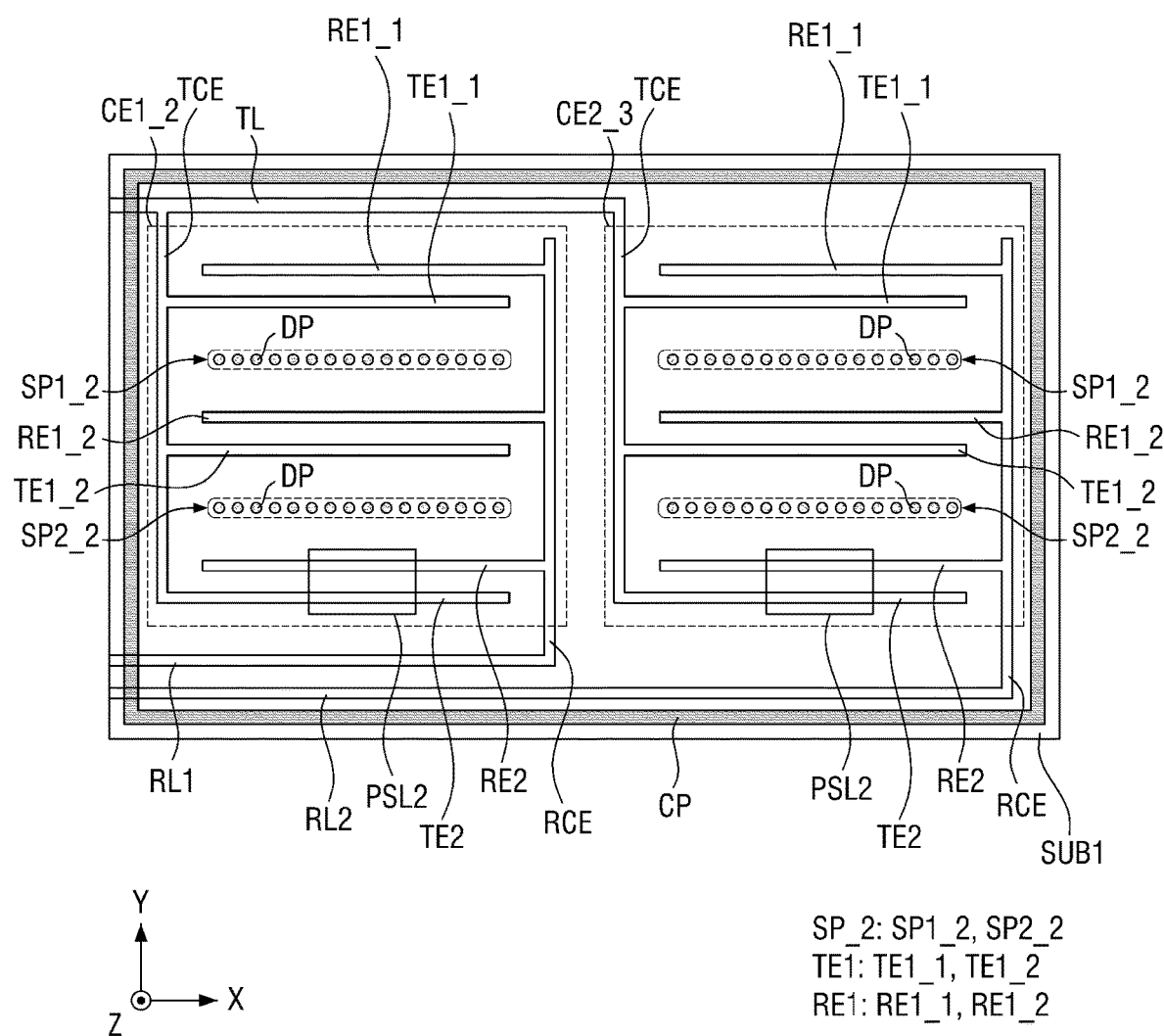
FIG. 17 is another exemplary enlarged plan view of the area A of FIG. 1.
Figure 18:
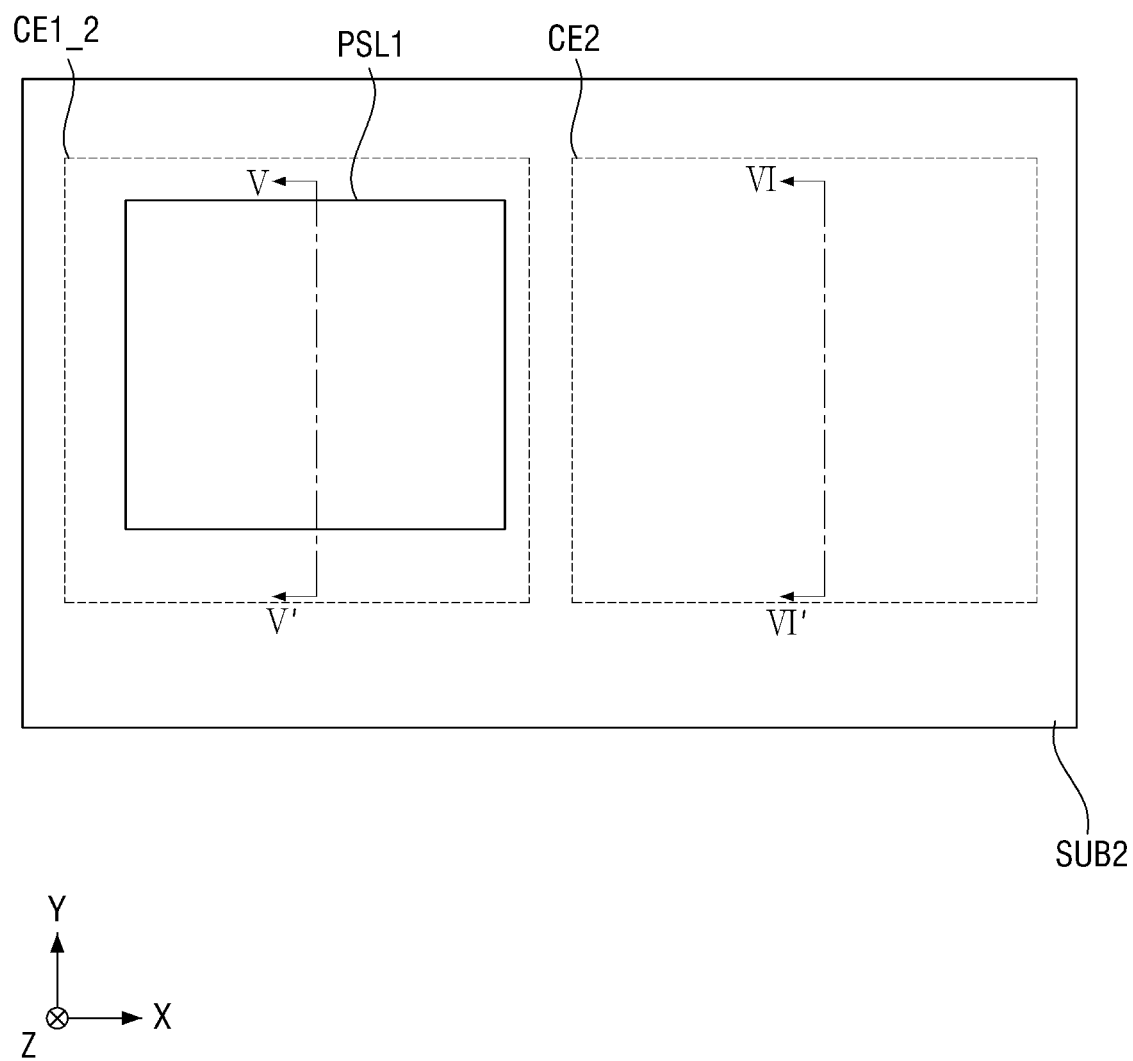
FIG. 18 is a plan view illustrating a second substrate of a pressure sensor according to an exemplary embodiment.
Figure 19:
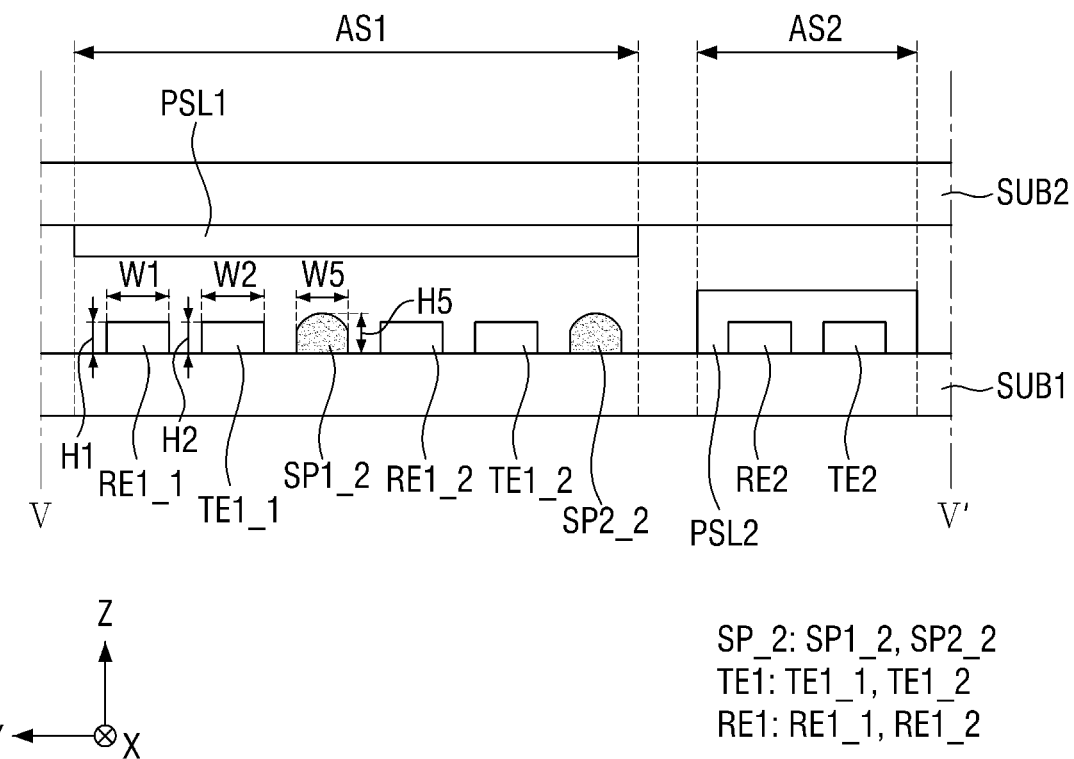
FIG. 19 is a cross-sectional view, taken along line V-V' of FIG. 16 or 18, of a pressure sensor according to an exemplary embodiment.
Figure 20:
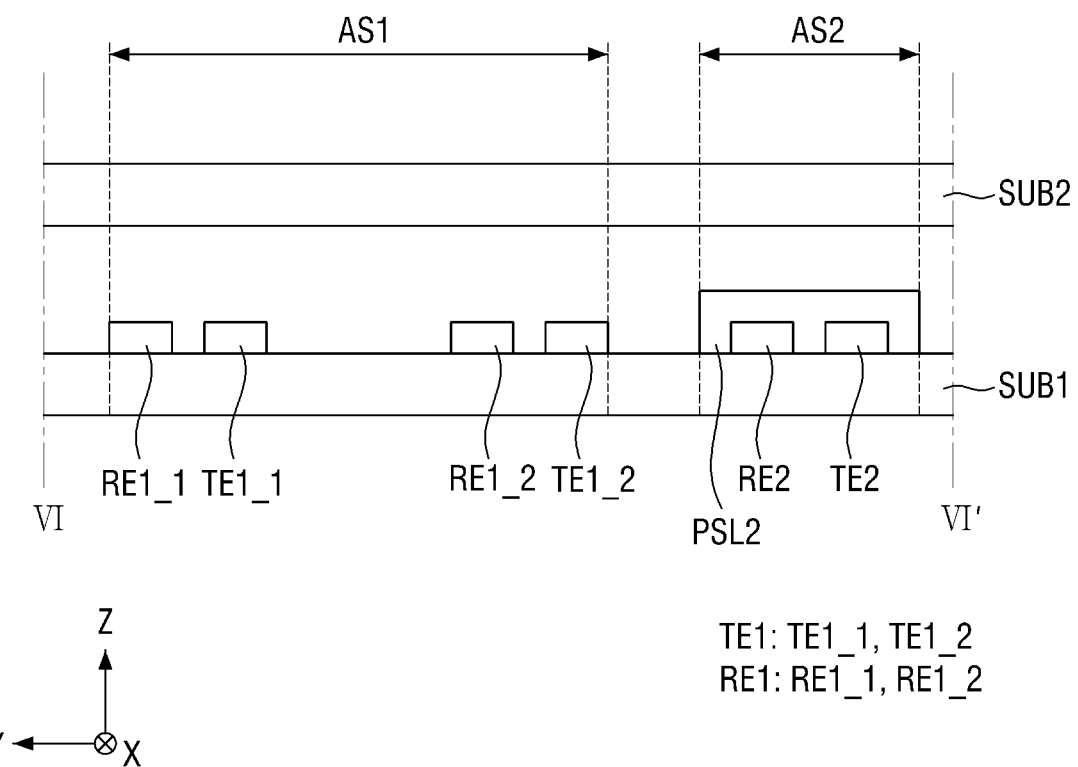
FIG. 20 is a cross-sectional view, taken along line VI-VI' of FIG. 16 or 18, of a pressure sensor according to an exemplary embodiment.

FIG. 16 is another exemplary enlarged plan view of the area A of FIG. 1, FIG. 17 is another exemplary enlarged plan view of the area A of FIG. 1, FIG. 18 is a plan view illustrating a second substrate of a pressure sensor according to an exemplary embodiment, FIG. 19 is a cross-sectional view, taken along line V-V' of FIG. 16 or 18, of a pressure sensor according to an exemplary embodiment, and FIG. 20 is a cross-sectional view, taken along line VI-VI' of FIG. 16 or 18, of a pressure sensor according to an exemplary embodiment. The embodiments of FIGS. 16 through 20 differ from the embodiments of FIGS. 11 through 15 in the shape of spacers. The embodiments of FIGS. 16 through 20 will hereinafter be described, focusing mainly on the differences with the embodiments of FIGS. 11 through 15.

Referring to FIGS. 16 and 18, in some embodiments, spacers SP_2 are disposed in a first sensing cell CE1_2. For example, first and second spacers SP1_2 and SP2_2 may be disposed in the first sensing cell CE1_2.

Each of the first and second spacers SP1_2 and SP2_2 may include a plurality of protrusions. For example, each of the first and second spacers SP1_2 and SP2_2 may include a plurality of protrusions DP, and the protrusions DP may be spaced apart from one another and may be arranged into a linear shape extending in a first direction (or an X-axis direction) in a plan view. However, the exemplary embodiments are not limited to this. Alternatively, the protrusions DP of each of the first and second spacers SP1_2 and SP2_2 may be arranged into various other shapes such as a polygonal shape and a circular shape. Still alternatively, the protrusions DP of the first spacer SP1_2 may be arranged into a different shape from the protrusions DP of the second spacer SP2_2. Still alternatively, the protrusions DP of each of the first and second spacers SP1_2 and SP2_2 may not be arranged into any particular shape, but may be scattered in a first area AS1.

The protrusions DP of each of the first and second spacers SP1_2 and SP2_2 may have a circular shape in a plan view, but the exemplary embodiments are not limited thereto. Alternatively, the protrusions DP of each of the first and second spacers SP1_2 and SP2_2 may have various other shapes such as a polygonal shape and an elliptical shape.

A second sensing cell CE2 detects a resistance variation caused by temperature, and the restorability of a pressure sensor 10 to its initial resistance is not much of an issue in the second sensing cell CE2. Thus, no spacers SP_2 are disposed in the second sensing cell CE2, but the exemplary embodiments are not limited thereto. Alternatively, as illustrated in FIG. 17, spacers SP_2 may be disposed in a second sensing cell CE2_3. Specifically, referring to FIG. 17, first and second spacers SP1_2 and SP2_2 may be disposed in the second sensing cell CE2_3, like in a first sensing cell CE1_2, and each of the first and second spacers SP1_2 and SP2_2 may include a plurality of protrusions DP.

Referring to FIG. 19, the first sensing cell CE1_2 may include first and second areas AS1 and AS2. The second area AS2 of the first sensing cell CE1_2 is the same as its counterpart of FIG. 6, and thus, a detailed description thereof will be omitted.

In the first area AS1 of the first sensing cell CE1_2, a first pressure sensing layer PSL1 may be disposed to overlap with a first driving electrode TE1, a first sensing electrode RE1, the first spacer SP1_2, and the second spacer SP2_2 in a third direction (or a Z-axis direction).

In some embodiments, a first sub-sensing electrode RE1_1 may have a first width W1, a first sub-driving electrode RE1_1 may have a second width W2, which is the same as the first width W1, and the first spacer SP1_2 may have a fifth width W5, which is smaller than the first and second widths W1 and W2.

The first sub-sensing electrode RE1_1, the second sub-sensing electrode RE1_2, and a second sensing electrode RE2 may have the same width, the first sub-driving electrode TE1_1, the second sub-driving electrode TE1_2, and a second driving electrode TE2 may have the same width, and the first and second spacers SP1_2 and SP2_2 may have the same width. However, the exemplary embodiments are not limited to this. When the width of the spacers SP_2 is smaller than the widths of the first sensing electrode RE1 and the first driving electrode TE1, the first pressure sensing layer PSL1 can be easily placed in contact with the first sensing electrode RE1 and the first driving electrode TE1 in response to pressure being applied thereto. Also, since each of the spacers SP_2 includes a plurality of protrusions DP that are spaced apart from one another and have curved top surfaces, the first pressure sensing layer PSL1 can be further easily placed in contact with the first sensing electrode RE1 and the first driving electrode TE1 in response to pressure being applied thereto.

In some embodiments, the first sub-sensing electrode RE1_1 may have a first height H1, the first sub-driving electrode TE1_1 may have a second height H2, which is the same as the first height H1, and the first spacer SP1_2 may have a fifth height H5, which is greater than the first and second heights H1 and H2. Specifically, the protrusions DP of the first spacer SP1_2 may have the fifth height H5, which is greater than the first and second heights H1 and H2. For example, the protrusions DP of the first spacer SP1_2 may be 1 or 2 μm higher than the first sensing electrode RE1 and the first driving electrode TE1, but the exemplary embodiments are not limited thereto. Alternatively, the protrusions DP of the first spacer SP1_2 may have different heights. For example, the height of some of the protrusions DP of the first spacer SP1_2 may be greater than the first and second heights H1 and H2, and the height of the rest of the protrusions DP of the first spacer SP1_2 may be the same as the first and second heights H1 and H2.

The first sub-sensing electrode RE1_1, the second sub-sensing electrode RE1_2, and the second sensing electrode RE2 may have the same height, the first sub-driving electrode TE1_1, the second sub-driving electrode TE12_2, and the second driving electrode TE2 may have the same height, and the protrusions DP of the first spacer SP1_2 and the protrusions DP of the second spacer SP2_2 may have the same height.

Referring to FIG. 20, the second sensing cell CE2 only differs from the first sensing cell CE1_2 in that the first pressure sensing layer PSL1 and the first and second spacers SP1_2 and SP2_2 are not provided therein, and thus, a detailed description thereof will be omitted.

Figure 21:
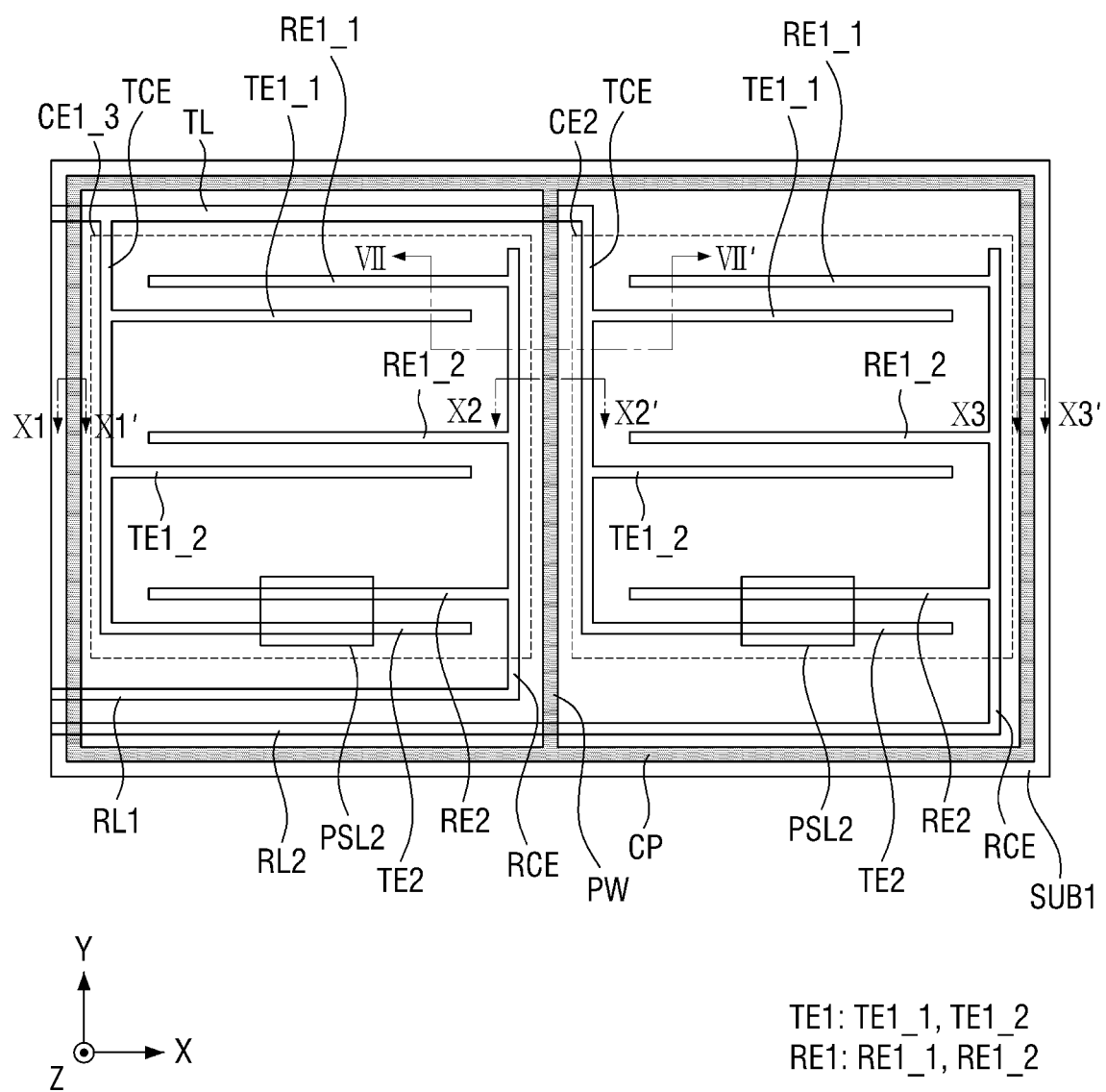
FIG. 21 is another exemplary enlarged plan view of the area A of FIG. 1.
Figure 22:
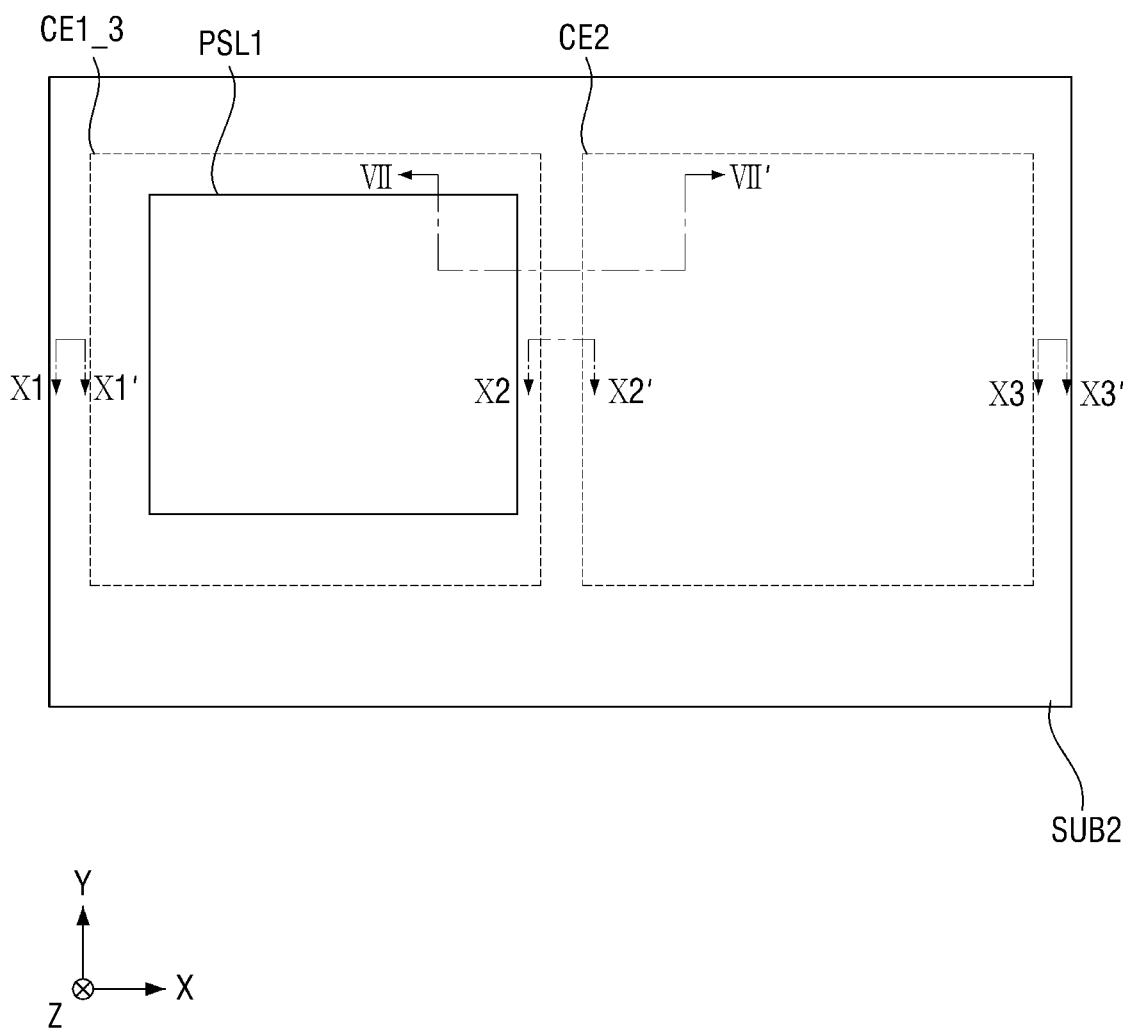
FIG. 22 is a plan view illustrating a second substrate of a pressure sensor according to an exemplary embodiment.
Figure 23:
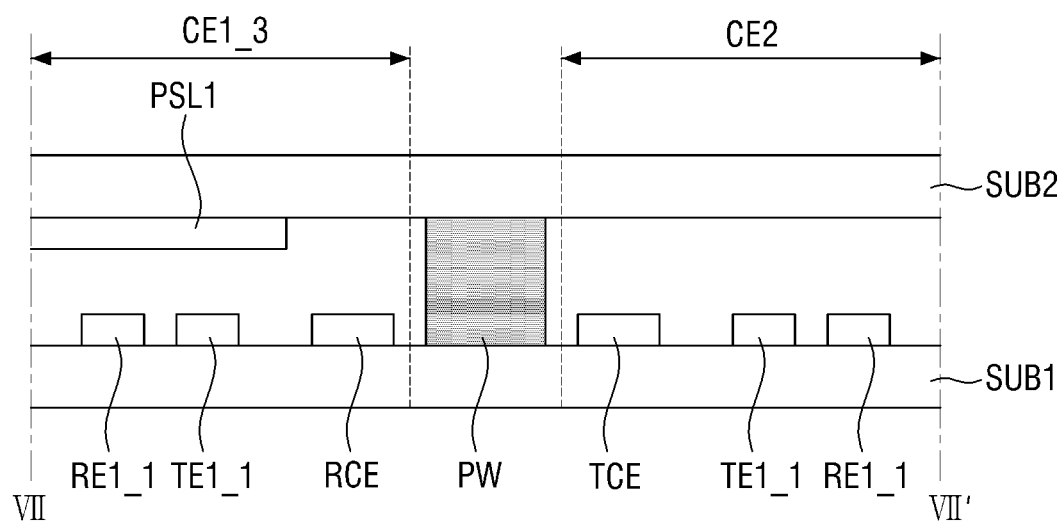
FIG. 23 is a cross-sectional view, taken along line VII-VII' of FIG. 21 or 22, of a pressure sensor according to an exemplary embodiment.
Figure 24:
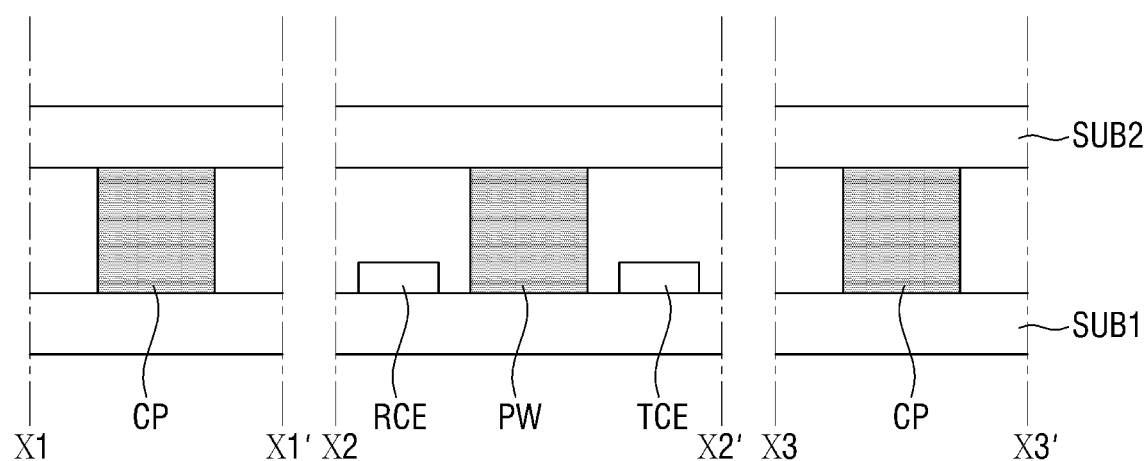
FIG. 24 is a cross-sectional view, taken along lines X1-X1', X2-X2', and X3-X3' of FIG. 21 or 22, of a pressure sensor according to an exemplary embodiment.
Figure 24:
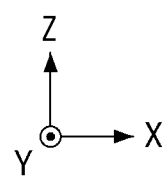

FIG. 21 is another exemplary enlarged plan view of the area A of FIG. 1, FIG. 22 is a plan view illustrating a second substrate of a pressure sensor according to an exemplary embodiment, FIG. 23 is a cross-sectional view, taken along line VII-VII' of FIG. 21 or 22, of a pressure sensor according to an exemplary embodiment, and FIG. 24 is a cross-sectional view, taken along lines X1-X1', X2-X2', and X3-X3' of FIG. 21 or 22, of a pressure sensor according to an exemplary embodiment. The embodiments of FIGS. 21 through 24 differ from the embodiments of FIGS. 3 through 8 in that a partition wall PW is provided instead of spacers. The embodiments of FIGS. 21 through 24 will hereinafter be described, focusing mainly on the differences with the embodiments of FIGS. 3 through 8.

Referring to FIGS. 21 and 22, in some embodiments, a partition wall PW may be disposed between first and second sensing cells CE1_3 and CE2. For example, a partition wall PW extending in a second direction (or a Y-axis direction) may be disposed between the first and second sensing cells CE1_3 and CE2. The partition wall PW may be disposed between a sensing connecting electrode RCE of the first sensing cell CE1_3 and a driving connecting electrode TCE of the second sensing cell CE2. Both ends of the partition wall PW may be in contact with a coupling layer CP, but the exemplary embodiments are not limited thereto. Alternatively, both ends of the partition wall PW may be a predetermined distance apart from the coupling layer CP.

The partition wall PW may be disposed on a first substrate SUB1, but the exemplary embodiments are not limited thereto. Alternatively, the partition wall PW may be disposed on both the first substrate SUB1 and a second substrate SUB2.

The partition wall PW may be formed as a bar extending between the first and second sensing cells CE1_3 and CE2 along the second direction (or the Y-axis direction), but the exemplary embodiments are not limited thereto. Alternatively, the partition wall PW may include a plurality of protrusions that are spaced apart from one another in the second direction (or the Y-axis direction) and are arranged into a linear shape extending between the first and second sensing cells CE1_3 and CE2.

The partition wall PW may be formed of the same material as the coupling layer CP. For example, the partition wall PW may include a PSA layer, in which case, the partition wall PW can be formed using the same process as the coupling layer CP without a requirement of an additional process. The arrangement of the partition wall PW is not limited to that illustrated in FIG. 21, and various spacers may be additionally provided together with the partition wall PW.

Referring to FIG. 23, the partition wall PW may be disposed between the first and second sensing cells CE1_3 and CE2 and may be in contact with the first and second substrates SUB1 and SUB2. That is, the height of the partition wall PW may be greater than the heights of a first driving electrode TE1, a first sensing electrode RE1, a sensing connecting electrode RCE, and a driving connecting electrode TCE of each of the first and second sensing cells CE1_3 and CE2. Also, the width of the partition wall PW may be greater than the widths of the first driving electrode TE1, the first sensing electrode RE1, the sensing connecting electrode RCE, and the driving connecting electrode TCE of each of the first and second sensing cells CE1_3 and CE2, but the exemplary embodiments are not limited thereto. Alternatively, the width of the partition wall PW may be the same as, or smaller than, the widths of the first driving electrode TE1, the first sensing electrode RE1, the sensing connecting electrode RCE, and the driving connecting electrode TCE of each of the first and second sensing cells CE1_3 and CE2.

Referring to FIG. 24, the height of the partition wall PW may be the same as the height of the coupling layer CP. For example, the partition wall PW and the coupling layer CP may be disposed between, and in contact with, the first and second substrates SUB1 and SUB2. The width of the partition wall PW may be the same as the width of the coupling layer CP, but the exemplary embodiments are not limited thereto. Alternatively, the partition wall PW may have a different width from the coupling layer CP. In short, the partition wall PW may be disposed between, and in contact with, the first and second sensing cells CE1_3 and CE2 and may thus improve the restoring force of a pressure sensor 10.

Figure 25:
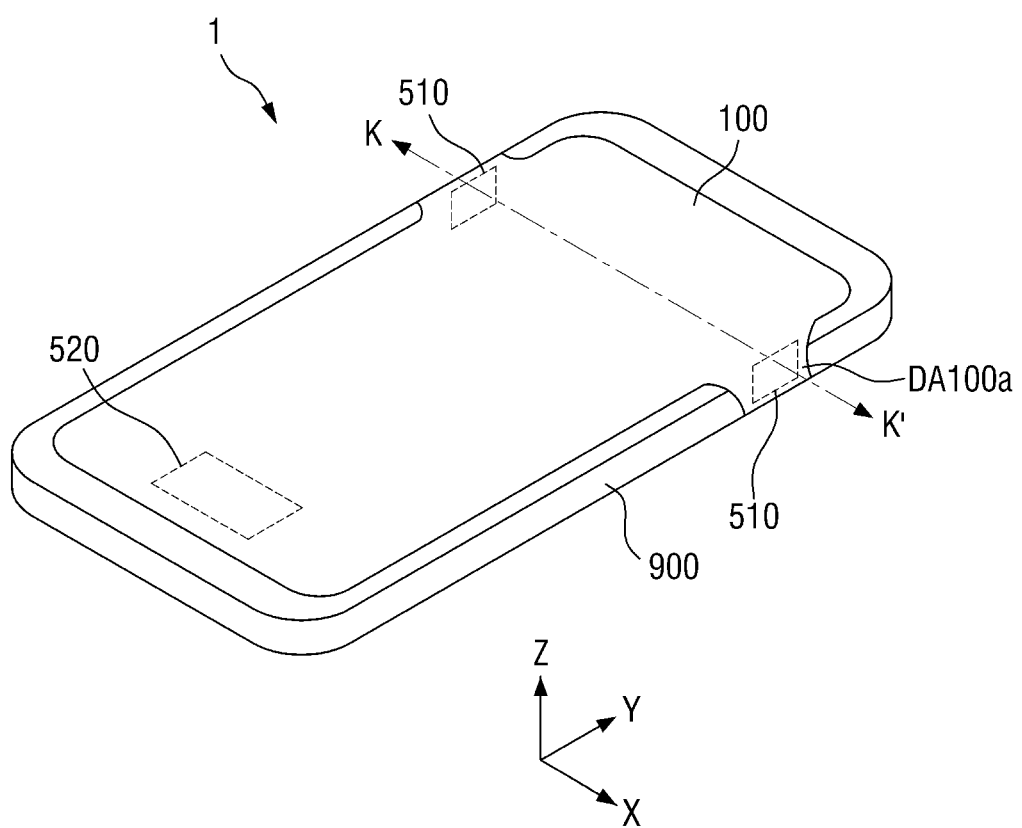
FIG. 25 is a perspective view of a display device according to an exemplary embodiment.
Figure 27:
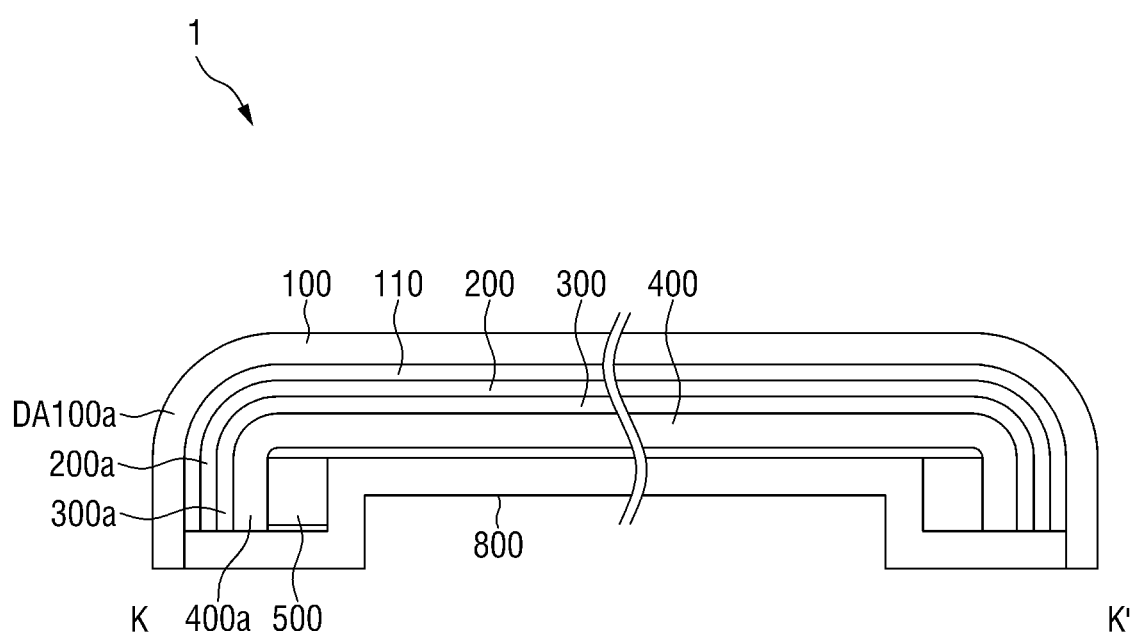
FIG. 27 is a cross-sectional view taken along line K-K' of FIG. 25.
Figure 28:
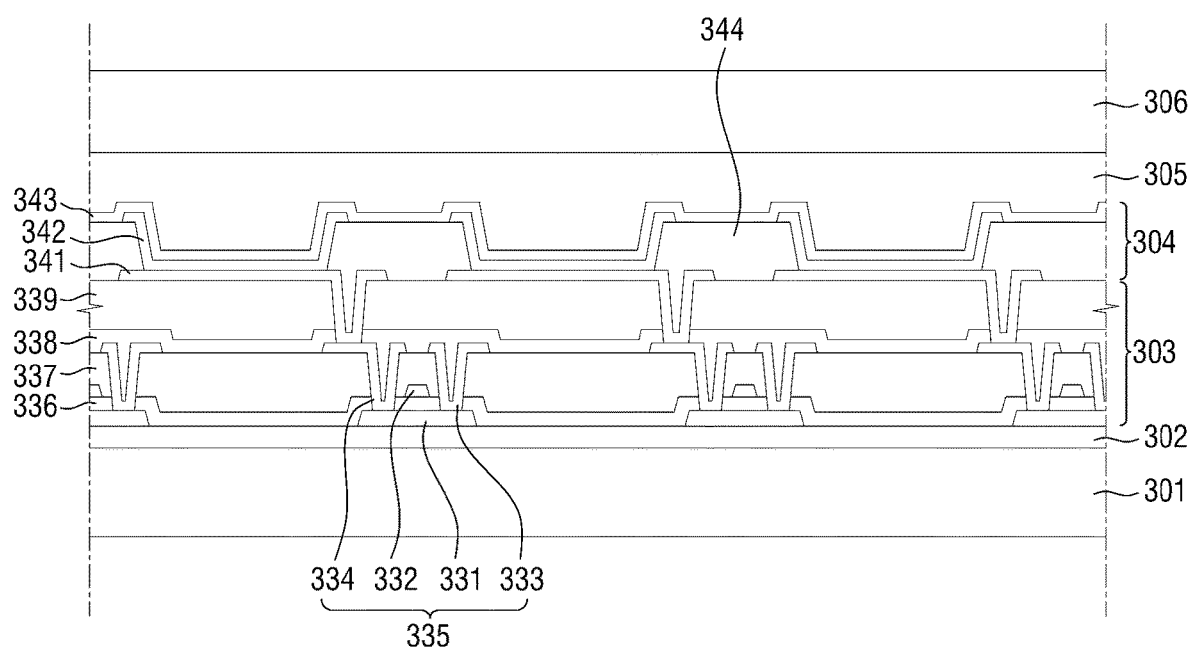
FIG. 28 is a cross-sectional view illustrating a display area of a display panel of FIG. 27.

FIG. 25 is a perspective view of a display device according to an exemplary embodiment, FIG. 26 is an exploded perspective view of the display device of FIG. 25, FIG. 27 is a cross-sectional view taken along line K-K' of FIG. 25, and FIG. 28 is a cross-sectional view illustrating a display area of a display panel of FIG. 27.

Referring to FIGS. 25 through 27, a display device 1 includes a cover window 100, a touch sensing device 200, a touch circuit board 210, a touch driving unit 220, a display panel 300, a display circuit board 310, a panel bottom member 400, first pressure sensors 510, a second pressure sensor 520, a lower bracket 800, a main circuit board 910, and a lower cover 900.

The display device 1 may have a rectangular shape in a plan view. For example, the display device 1 may have a rectangular shape with short sides extending in a first direction (or the X-axis direction) and long sides extending in a second direction (or the Y-axis direction) in a plan view. The corners at which the short sides and the long sides of the display device 1 meet may be rounded with a predetermined curvature, as illustrated in FIG. 25, or may be right-angled. However, the planar shape of the display device 1 is not particularly limited, and the display device 1 may have various shapes other than a rectangular shape, such as another polygonal shape, a circular shape, or an elliptical shape, in a plan view.

The cover window 100 may be disposed on the display panel 300 to cover the top surface of the display panel 300. Accordingly, the cover window 100 may protect the top surface of the display panel 300. The cover window 100 may be attached to the touch sensing device 200 via an adhesive layer 110, as illustrated in FIG. 27. The adhesive layer 110 may be an OCA or an optically clear resin (OCR).

The cover window 100 may include a light-transmitting part DA100 corresponding to a display area DA of the display panel 300 and a light-blocking part NDA100 corresponding to a non-display area NDA of the display device 1. The light-blocking part NDA100 of the cover window 100 may be opaque. The light-blocking part NDA100 of the cover window 100 may be formed as a decorative layer that may be viewed to a user when an image is not displayed. For example, a company's logo such as "SAMSUNG" or a string of characters or letters may be patterned into the light-blocking part NDA100 of the cover window 100.

The cover window 100 may be formed of glass, sapphire, and/or plastic. The cover window 100 may be rigid or flexible.

The touch sensing device 200, which includes touch sensors for detecting touch input from the user, may be disposed between the cover window 100 and the display panel 300. The touch sensing device 200, which is a device for detecting the location of touch input from the user, may be implemented in a capacitive manner such as a self-capacitance manner or a mutual capacitance manner or may be implemented in an infrared manner.

The touch sensing device 200 may be formed as a panel or a film. Alternatively, the touch sensing device 200 may be formed in one integral body with the display panel 300. In a case where the touch sensing device 200 is formed as a film, the touch sensing device 200 may be formed in one integral body with a barrier film for encapsulating the display panel 300.

The touch circuit board 210 may be attached to one side of the touch sensing device 200. Specifically, the touch circuit board 210 may be attached on pads provided on one side of the touch sensing device 200 using an anisotropic conductive film. Also, a touch connecting part may be provided at the touch circuit board 210, and the touch connecting part may be connected to a connector of the display circuit board 310. The touch circuit board 210 may be a flexible printed circuit board or a chip-on film.

The touch driving unit 220 may apply touch driving signals to the touch driving electrodes of the touch sensing device 200, may detect sensing signals from the touch sensing electrodes of the touch sensing device 200, and may calculate the location of touch input from the user by analyzing the sensing signals. The touch driving unit 220 may be formed as an integrated circuit and may be mounted on the touch circuit board 210.

The display panel 300 may include the display area DA and the non-display area NDA. The display area DA is an area in which images are displayed, and the non-display area NDA is an area in which no images are displayed and which is peripheral to the display area DA. The non-display area NDA may be disposed to surround the display area DA, as illustrated in FIGS. 25 and 26, but the exemplary embodiments are not limited thereto. Alternatively, the display area DA may be disposed to overlap with the light-transmitting part 100DA of the cover window 100, and the non-display area NDA may be disposed to overlap with the light-blocking part 100NDA of the cover window 100.

The display panel 300 may be a light-emitting display panel including light-emitting elements. For example, the display panel 300 may be an organic light-emitting diode (OLED) display panel using OLEDs, a micro light-emitting diode (mLED) display panel using mLEDs, or a quantum-dot light-emitting diode (QLED) display panel using QLEDs. In the description that follows, it is assumed that the display panel 300 is an OLED display panel as illustrated in FIG. 28.

The display area DA of the display panel 300 refers to an area in which a light-emitting element layer 304 is formed and as a result, an image can be displayed, and the non-display area NDA of the display panel 300 refers to an area peripheral to the display area DA.

The display panel 300 may include a supporting substrate 301, a flexible substrate 302, a thin-film transistor (TFT) layer 303, the light-emitting element layer 304, an encapsulation layer 305, and a barrier film 306, as illustrated in FIG. 28.

The flexible substrate 302 is disposed on the supporting substrate 301. The supporting substrate 301 and the flexible substrate 302 may include a polymer material with flexibility. For example, the supporting substrate 301 and the flexible substrate 302 may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof.

The TFT layer 303 is formed on the flexible substrate 302. The TFT layer 303 includes TFTs 335, a gate insulating film 336, an interlayer insulating film 337, a passivation film 338, and a planarization film 339.

A buffer film may be formed on the flexible substrate 302. The buffer film may be disposed on the flexible substrate 302 to protect the TFTs 335 and light-emitting elements against moisture that penetrates the supporting substrate 301 and the flexible substrate 302, which are highly susceptible to moisture. The buffer film may consist of a plurality of inorganic films that are alternately stacked. For example, the buffer film may be formed as a multilayer film in which at least one inorganic film such as a silicon oxide (SiOx) film, a silicon nitride (SiNx) film, and a SiON film is alternately stacked. The buffer film may not be provided.

The TFTs 335 are formed on the buffer film. The TFTs 335 include active layers 331, gate electrodes 332, source electrodes 333, and drain electrodes 334. FIG. 8 illustrate that the TFTs 335 are top gate-type TFTs in which the gate electrodes 332 are disposed above the active layers 331, but the exemplary embodiments are not limited thereto. In another example, the TFTs 335 may be bottom gate-type TFTs in which the gate electrodes 332 are disposed below the active layers 331 or may be double gate-type TFTs in which the gate electrodes 332 are disposed both above and below the active layers 331.

The active layers 331 are formed on the buffer film. The active layers 331 may be formed of a silicon-based semiconductor material or an oxide-based semiconductor material. A light-shielding layer for shielding external light incident upon the active layers 331 may be formed between the buffer film and the active layers 331.

The gate insulating film 336 may be disposed on the active layers 331. The gate insulating film 336 may be formed as an inorganic film such as, for example, a silicon oxide (SiOx) film, a silicon nitride (SiNx) film, or a multilayer film thereof.

The gate electrodes 332 and gate lines may be formed on the gate insulating film 336. The gate electrodes 332 and the gate lines may be formed as single- or multilayer films using molybdenum (Mo), Al, chromium (Cr), gold (Au), Ti, Ni, neodymium (Nd), Cu, or an alloy thereof.

The interlayer insulating film 337 may be formed on the gate electrodes 332 and the gate lines. The interlayer insulating film 337 may be formed as an inorganic film such as, for example, a silicon oxide (SiOx) film, a silicon nitride (SiNx) film, or a multilayer film thereof.

The source electrodes 333, the drain electrodes 334, and data lines may be disposed on the interlayer insulating film 337. The source electrodes 333 and the drain electrodes 334 may be connected to the active layers 331 via contact holes that penetrate the gate insulating film 336 and the interlayer insulating film 337. The source electrodes 333, the drain electrodes 334, and the data lines may be formed as single- or multilayer films using Mo, Al, Cr, Au, Ti, Ni, Nd, Cu, or an alloy thereof.

The passivation film 338 may be disposed on the source electrodes 333, the drain electrodes 334, and the data lines to insulate the TFTs 335. The passivation film 338 may be formed as an inorganic film such as, for example, a silicon oxide (SiOx) film, a silicon nitride (SiNx) film, or a multi-layer film thereof.

The planarization film 339 may be disposed on the passivation film 338 to planarize height differences formed by the TFTs 335. The planarization film 339 may be formed of an organic film formed of an acrylic resin, an epoxy resin, a phenolic resin, a polyamide resin, or a polyimide resin.

The light-emitting element layer 304 is formed on the TFT layer TFTL. The light-emitting element layer 304 includes light-emitting elements and pixel defining films 344.

The light-emitting elements and the pixel defining films 344 are formed on the planarization film 339. The light-emitting elements may be OLEDs. In this case, the light-emitting elements may include anode electrodes 341, light-emitting layers 342, and a cathode electrode 343.

The anode electrodes 341 may be disposed on the planarization film 339. The anode electrodes 341 may be connected to the source electrodes 333 of the TFTs 335 via contact holes that penetrate the passivation film 338 and the planarization film 339.

The pixel defining films 344 are formed on the planarization film 339 to cover the edges of each of the anode electrodes 341 and thus to separate pixels. That is, the pixel defining films 344 define the pixels. The pixels refer to regions in which the anode electrodes 341, the light-emitting layers 342, and the cathode electrode 343 are sequentially stacked and as a result, light can be emitted in response to holes from the anode electrodes 341 and electrons from the cathode electrode 343 being combined together in the light-emitting layers 342.

The light-emitting layers 342 are formed on the anode electrodes 341 and the pixel defining films 344. The light-emitting layers 342 may be organic light-emitting layers. The light-emitting layers 342 may emit one of red light, green light, and blue light. The peak wavelength of the red light may range from about 620 nm to about 750 nm, the peak wavelength of the green light may range from about 495 nm to about 570 nm, and the peak wavelength of the blue light may range from about 450 nm to about 495 nm. Alternatively, the light-emitting layers 342 may be white light-emitting layers emitting white light. In this case, the light-emitting layers 342 may have a structure in which a red light-emitting layer, a green light-emitting layer, and a blue light-emitting layer are stacked and may be formed as a single layer that is formed in common for all the pixels. Also, in this case, the display panel 300 may further include additional color filters for displaying red, green, and blue colors.

The light-emitting layers 342 may include hole transport layers, emission layers, and electron transport layers. Also, the light-emitting layers 342 may have a tandem structure having two or more stacks, in which case, a charge generation layer may be formed between the two or more stacks.

The cathode electrode 343 is formed on the light-emitting layers 342. The cathode electrode 343 may be formed to cover the cathode electrode 343. The cathode electrode 343 may be a layer that is formed in common for all the pixels.

In a top emission structure where the light-emitting element layer 304 emits light in an upward direction, the anode electrodes 341 may be formed of a metal material having high reflectance such as a stack of aluminum and titanium (e.g., Ti/Al/Ti), a stack of aluminum and indium tin oxide (ITO) (e.g., ITO/Al/ITO), a silver-palladium-copper (APC) alloy, and a stack of an APC alloy and ITO (e.g., ITO/APC/ITO), and the cathode electrode 343 may be formed of a transparent conductive material (TCO) capable of transmitting light therethrough such as ITO or indium zinc oxide (IZO) or a semi-transmissive conductive material such as magnesium (Mg), Ag, or an alloy thereof. In a case where the cathode electrode 343 is formed of a semi-transmissive metal material, the emission efficiency of the display device 1 can be improved due to micro cavities.

In a bottom emission structure where the light-emitting element layer 304 emits light in a downward direction, the anode electrodes 341 may be formed of a TCO capable of transmitting light therethrough such as ITO or IZO or a semi-transmissive conductive material such as Mg, Ag, or an alloy thereof, and the cathode electrode 343 may be formed of a metal material having high reflectance such as a stack of aluminum and titanium (e.g., Ti/Al/Ti), a stack of aluminum and ITO (e.g., ITO/Al/ITO), an APC alloy, and a stack of an APC alloy and ITO (e.g., ITO/APC/ITO). In a case where the anode electrodes 341 are formed of a semi-transmissive metal material, the emission efficiency of the display device 1 can be improved due to micro cavities.

The encapsulation layer 305 is formed on the light-emitting element layer 304. The encapsulation layer 305 prevents oxygen or moisture from penetrating the light-emitting layers 342 and the cathode electrode 343. To this end, the encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation layer 305 may further include at least one organic film. The organic film may be formed to be sufficiently thick to prevent foreign particles from infiltrating into the light-emitting layers 342 and the cathode electrode 343 through the encapsulation layer 305. The organic film may include one of epoxy, acrylate, and urethane acrylate.

The barrier film 306 is disposed on the encapsulation layer 305. The barrier film 306 is disposed to cover the encapsulation layer 305 to protect the light-emitting element layer 304 against oxygen or moisture. The barrier film 306 may be formed in one integral body with the touch sensing device 200.

A polarizing film may be provided on the top surface of the display panel 300 to prevent the degradation of visibility, caused by the reflection of external light.

The display circuit board 310 may be attached to one side of the display panel 300. Specifically, the display circuit board 310 may be attached to pads provided on one side of the display panel 300 via an anisotropic conductive film.

The touch circuit board 210 and the display circuit board 310 may be bent from the top toward the bottom of the display panel 300, as illustrated in FIG. 26. The display circuit board 310 may be connected to the touch connecting part of the touch circuit board 210. The display circuit board 310 may include pads, instead of connectors, in which case, the display circuit board 310 may be connected to the touch circuit board 210 via anisotropic conductive films. The display circuit board 310 may be connected to the main circuit board 910 via a connector 340.

The display driving unit 320 outputs signals and voltages for driving the display panel 300 via the display circuit board 310. The display driving unit 320 is formed as an integrated circuit and may be mounted on the display circuit board 310, but the exemplary embodiments are not limited thereto. Alternatively, the display driving unit 320 may be attached to one side of the display panel 300.

The panel bottom member 400 may be disposed on the bottom surface of the display panel 300. The panel bottom member 400 may include at least one of a heat dissipation member for effectively releasing heat, an electromagnetic wave-shielding layer for blocking electromagnetic waves, a light-shielding layer for blocking external light incident thereupon, a light-absorbing member for absorbing external light incident thereupon, and a buffer member for absorbing external impact.

Specifically, the panel bottom member 400 may include a light-absorbing member, a buffer member, and a heat dissipation member.

The light-absorbing member may be disposed below the display panel 300. The light-absorbing member blocks the transmission of light and thus prevents the elements disposed therebelow, such as the first pressure sensors 510 and the second pressure sensor 520, from becoming visible from above the display panel 300. The light-absorbing member may include a light-absorbing material such as a black pigment or dye.

The buffer member may be disposed below the light-absorbing member. The buffer member absorbs external impact and thus prevents the display panel 300 from being damaged. The buffer member may be formed as a single- or multilayer film. For example, the buffer member may be formed of a polymer resin such as polyurethane (PU), PC, polypropylene (PP), or polyethylene (PE) or may include an elastic material such as a sponge obtained by foam-molding rubber, a urethane material, or an acrylic material. The buffer member may be a cushion layer.

The heat dissipation member may be disposed below the buffer member. The heat dissipation member may include at least one heat dissipation layer. For example, the heat dissipation member may include a first heat dissipation layer including graphite or carbon nanotubes or a second heat dissipation layer including a film of a metal with excellent thermal conductivity such as copper (Cu), nickel (Ni), ferrite, or silver (Ag).

The display panel 300 may include at least one panel protruding part 300a, which protrudes from at least one side of the display panel 300. For example, as illustrated in FIG. 25, the display panel 300 may include panel protruding parts 300a, which protrude from the left and right sides of the display panel 300.

The panel protruding parts 300a may protrude from sides of the display panel 300 and may be bent. In the panel protruding parts 300a, a light-emitting element layer 304 may be provided so that the display area DA, in which images are displayed, can be formed. In this case, images displayed by the panel protruding part 300a can be viewed from sides of the display device 1.

The touch sensing device 200 may include touch protruding parts 200a, which overlap with the panel protruding parts 300a of the display panel 300. In the touch protruding parts 200a, touch sensors for detecting touch input from the user may be provided.

The cover window 100 may include side light-transmitting parts DA100a, which are formed to overlap with the panel protruding parts 300a and allow the panel protruding parts 300a to be visible from sides of the display device 1. The panel protruding parts 300a can be viewed through the side light-transmitting parts DA100a.

The panel bottom member 400 may include lower protruding parts 400a, which overlap with the panel protruding parts 300a. In the lower protruding parts 400a, like in the rest of the panel bottom member 400, the light-absorbing member, the buffer member, and the heat dissipation member may be provided.

The first pressure sensors 510 may be disposed below the lower protruding parts 400a. Specifically, a second substrate SUB2, which is disposed on the top surfaces of the first pressure sensors 510, may be attached to the bottom surfaces of the lower protruding parts 400a. Accordingly, the first pressure sensors 510 can detect pressure applied to the side light-transmitting parts DA100a of the cover window 100.

The second pressure sensor 520 may be disposed below the panel bottom member 400. The second pressure sensor 520 may be disposed close to one side of the panel bottom member 400. The second pressure sensor 520 can detect pressure applied to the light-transmitting part DA100 of the cover window 100.

The first pressure sensors 510 and the second pressure sensor 520 may be used as physical buttons of the display device 1.

For example, a first pressure sensor 510 attached to a lower protruding part 400a on a first side of the panel bottom member 400 may be used as a power button of the display device 1, and a first pressure sensor 510 attached to a lower protruding part 400a on a second side of the panel bottom member 400 may be used as a volume button of the display device 1. That is, if a first pressure is detected from the first pressure sensor 510 attached to the lower protruding part 400a on the first side of the panel bottom member 400, the screen of the display device 1 may be turned off. Also, if a second pressure, which is higher than the first pressure, is detected from the first pressure sensor 510 attached to the lower protruding part 400a on the first side of the panel bottom member 400 or if the first pressure is continuously detected from the first pressure sensor 510 attached to the lower protruding part 400a on the first side of the panel bottom member 400 for more than a predetermined period of time, a screen for making a selection as to whether to power off the display device 1 may be displayed. Also, if the first pressure is detected from a first pressure sensing cell of the first pressure sensor 510 attached to the lower protruding part 400a on the second side of the panel bottom member 400, the volume of the display device 1 may be lowered, and if the second pressure is detected from a second pressure sensing cell of the first pressure sensor 510 attached to the lower protruding part 400a on the second side of the panel bottom member 400, the volume of the display device 1 may be raised.

A second pressure sensor 520 disposed close to a side of the panel bottom member 400 may be used as a home button of the display device 1. That is, if the first pressure is detected from the second pressure sensor 520 disposed close to a side of the panel bottom member 400, the screen of the display device 1 may be turned on.

Each of the first pressure sensors 510 and the second pressure sensor 520 may be implemented as one of the pressure sensors described above with reference to FIGS. 1 through 24.

The lower bracket 800 may be disposed below the panel bottom member 400. The lower bracket 800 may include a synthetic resin, a metal, or both.

Specifically, the lower bracket 800 may be disposed to surround the cover window 100, the touch sensing device 200, the display panel 300, the panel bottom member 400, the first pressure sensors 510, the second pressure sensor 520, the touch circuit board 210, and the display circuit board 310. As illustrated in FIG. 27, the lower bracket 800 may be attached below the side light-transmitting parts DA100a of the cover window 100 and may have a cross-sectional shape with a height difference due to the presence of the touch protruding parts 200a, the panel protruding parts 300a, the lower protruding parts 400a, and the first pressure sensors 510. The lower bracket 800 may be disposed to surround ends of the touch protruding parts 200a, ends of the panel protruding parts 300a, ends of the lower protruding parts 400a, sides and the bottom surfaces of the first pressure sensors 510, and the bottom surface of the panel bottom member 400. Since the lower bracket 800 is disposed on the bottom surfaces of the first pressure sensors 510 to support the first pressure sensors 510, the first pressure sensors 510 can detect pressure applied to the side light-transmitting parts DA100a of the cover window 100.

The sides of the lower bracket 800 may be exposed on the sides of the display device 1. In some embodiments, the lower bracket 800 may not be provided, and only the lower cover 900 may exist.

The main circuit board 910 may be disposed below the lower bracket 800. The main circuit board 910 may be connected to a connector of the display circuit board 310 via a cable connected to the main connector 990. As a result, the main circuit board 910 can be electrically connected to the display circuit board 310 and the touch circuit board 210. Also, in a case where a pressure sensing circuit board (FSCB of FIG. 1) is connected to the display circuit board 310 or the touch circuit board 210, the main circuit board 910 can be electrically connected to the pressure sensing circuit board. The main circuit board 910 may be a printed circuit board or a flexible printed circuit board.

The main circuit board 910 may include a main processor 920 and a camera device 960, as illustrated in FIG. 26. FIG. 2 illustrates that the main processor 920, the camera device 960, and the main connector 990 are mounted on a surface of the main circuit board 910 that faces the lower bracket 800, but the exemplary embodiments are not limited thereto. Alternatively, the main processor 920, the camera device 960, and the main connector 990 are mounted on a surface of the main circuit board 910 that faces the lower cover 900.

The main processor 920 may control all the functions of the display device 1. For example, the main processor 920 may output image data to the display driving unit 320 of the display circuit board 310 so that the display panel 300 can display an image. Also, the main processor 920 may receive touch data from the touch driving unit 220, may determine the location of touch input from the user, and may execute an application pointed to by an icon displayed at the location of the touch input from the user. Also, the main processor 920 may receive pressure sensing data from a pressure sensing unit FD and may output a home screen, control the volume of the display device 1, or realize a haptic effect in accordance with the pressure sensing data. The main processor 920 may be an application processor, a central processing unit, or a system chip that consists of an integrated circuit.

The camera device 960 processes image frames (such as still or moving image frames) obtained by an image sensor in a camera mode and outputs the processed image frames to the main processor 920.

A mobile communication module, which can transmit wireless signals to, or receive wireless signals from, at least one of a base station, an external terminal, and a server via a mobile communication network, may be further mounted on the main circuit board 910. Examples of the wireless signals include audio signals, video call signals, and various types of data resulting from the transmission or receipt of text/multimedia messages. Also, an audio output device capable of outputting sound and a vibration device capable of generating vibration to realize a haptic effect may be further mounted on the main circuit board 910.

The lower cover 900 may be disposed below the lower bracket 800 and the main circuit board 910. The lower cover 900 may form the bottom exterior of the display device 1. The lower cover 900 may include plastic and/or a metal.

Some of the advantages that may be achieved by exemplary embodiments of the invention include improved reliability since spacers are provided between a driving electrode and a sensing electrode of a pressure sensor. Thus, restorability of the pressure sensor to its initial resistance can be improved.

In addition, since each pressure sensing cell includes a first resistance that varies in accordance with pressure applied thereto by a first pressure sensing layer and a second resistance that is defined by a second pressure sensing layer that is in contact with a second sensing electrode, the range of resistances of each pressure sensing cell that a pressure sensing unit is supposed to detect can be considerably reduced, and as a result, the manufacturing cost of the pressure sensing unit can be lowered.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pressure sensor comprising:
    first and second substrates;
    a first driving electrode and a first sensing electrode disposed on a first surface of the first substrate that faces the second substrate;
    a spacer disposed on the first surface of the first substrate between the first driving electrode and the first sensing electrode and spaced apart from the first driving electrode and the first sensing electrode; and
    a first pressure sensing layer disposed on a first surface of the second substrate that faces the first substrate and overlapping with the first driving electrode and the first sensing electrode in a thickness direction.

2. The pressure sensor of claim 1, wherein the pressure sensor is configured to form gaps between the first pressure sensing layer and the first driving electrode and between the first pressure sensing layer and the first sensing electrode.

3. The pressure sensor of claim 2, further comprising:
    a second driving electrode and a second sensing electrode disposed on the first surface of the first substrate; and
    a second pressure sensing layer in contact with the second driving electrode and the second sensing electrode.

4. The pressure sensor of claim 3, wherein the spacer is formed as a bar and is disposed between the first driving electrode and the first sensing electrode.

5. The pressure sensor of claim 4, wherein a width of the spacer is smaller than widths of the first driving electrode and the first sensing electrode.

6. The pressure sensor of claim 5, wherein a height of the spacer is smaller than heights of the first driving electrode and the first sensing electrode.

7. The pressure sensor of claim 3, wherein
    the spacer comprises a plurality of protrusions, and the protrusions are spaced apart from one another and do not overlap with the first driving electrode and the first sensing electrode in the thickness direction.

8. The pressure sensor of claim 3, wherein
a plurality of first driving electrodes and a plurality of first sensing electrodes are disposed on the first surface of the first substrate, and
the plurality of first driving electrodes and the plurality of first sensing electrodes are arranged along a first direction to alternate with one another in a second direction, which intersects the first direction.

9. The pressure sensor of claim 8, further comprising:
a driving connecting electrode to which the plurality of first driving electrodes and the second driving electrode are connected; and
a sensing connecting electrode to which the plurality of first sensing electrodes and the second sensing electrode are connected,
wherein the spacer is disposed between the driving connecting electrode and the sensing connecting electrode.

10. The pressure sensor of claim 9, further comprising:
a driving line connected to the driving connecting electrode and configured to receive a driving voltage; and
a sensing line connected to the sensing connecting electrode.

11. The pressure sensor of claim 8, wherein
the number of first driving electrodes is greater than the number of second driving electrodes, and
the number of first sensing electrodes is greater than the number of second sensing electrodes.

12. A pressure sensor comprising:
a first sensing cell comprising a first driving electrode and a first sensing electrode disposed on a first surface of a first substrate, and a first pressure sensing layer disposed on a first surface of a second substrate that faces the first substrate;
a second sensing cell comprising a first driving electrode and a first sensing electrode; and
a partition wall disposed between the first and second sensing cells and spaced apart from the first driving electrodes and the first sensing electrodes of the first and second sensing cells.

13. The pressure sensor of claim 12, wherein the partition wall is in contact with the first surfaces of the first and second substrates.

14. The pressure sensor of claim 13, wherein the pressure sensor is configured to form gaps between the first pressure sensing layer and the first driving electrode and between the first pressure sensing layer and the first sensing electrode.

15. The pressure sensor of claim 14, wherein each of the first and second sensing cells further comprises a second driving electrode and a second sensing electrode disposed on the first surface of the first substrate that faces the second substrate, and a second pressure sensing layer disposed in contact with the second driving electrode and the second sensing electrode.

16. The pressure sensor of claim 15, further comprising:
a coupling layer disposed between the first and second substrates to surround the first and second substrates,
wherein the coupling layer and the partition wall are connected to each other.

17. The pressure sensor of claim 16, wherein
the first sensing cell further comprises a spacer disposed to overlap with the first pressure sensing layer, but not with the first driving electrode and the first sensing electrode of the first sensing cell, in a thickness direction, and
the pressure sensor is configured to form a gap between the first pressure sensing layer and the spacer.

18. A display device comprising:
a display panel; and
a pressure sensor disposed on a bottom surface of the display panel,
wherein
the pressure sensor comprises first and second substrates, a first driving electrode and a first sensing electrode disposed on a first surface of the first substrate that faces the second substrate, a spacer disposed on the first surface of the first substrate between the first driving electrode and the first sensing electrode, and a first pressure sensing layer disposed on a first surface of the second substrate that faces the first substrate and overlaps with the first driving electrode and the first sensing electrode in a thickness direction, and
the pressure sensor is configured to form gaps between the first pressure sensing layer and the first driving electrode and between the first pressure sensing layer and the first sensing electrode.

19. The display device of claim 18, wherein
the display panel comprises a panel protruding part that protrudes from one side of the display panel, and
the display device further comprises an additional pressure sensor disposed on a bottom surface of the panel protruding part.

20. The display device of claim 19, further comprising:
a cover window disposed on the display panel and comprising a light-transmitting part corresponding to a display area of the display panel, and a side light-transmitting part overlapping with the panel protruding part.

* * * * *